(12) United States Patent
Ritter et al.

(10) Patent No.: US 12,143,285 B2
(45) Date of Patent: Nov. 12, 2024

(54) CONTROLLER AREA NETWORK AND CONNECTIVITY HEALTH TROUBLESHOOTING SYSTEM

(71) Applicant: DEERE & COMPANY, Moline, IL (US)

(72) Inventors: Curtis P. Ritter, Waterloo, IA (US); Devin Mangus, Ankeny, IA (US); Joseph A. Bell, Marion, IN (US); Murtaza Hita, Udaipur (IN); Arjun Subhash Shinde, Pune (IN); Jitender Kumar Chandwani, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/580,351

(22) Filed: Jan. 20, 2022

(65) Prior Publication Data
US 2023/0231784 A1  Jul. 20, 2023

(51) Int. Cl.
*H04L 43/0811* (2022.01)
*H04L 12/10* (2006.01)
*H04L 12/40* (2006.01)
*H04L 43/0823* (2022.01)
*H04L 67/12* (2022.01)
(Continued)

(52) U.S. Cl.
CPC .......... *H04L 43/0811* (2013.01); *H04L 12/40* (2013.01); *H04L 67/12* (2013.01); *H04W 24/04* (2013.01); *H04W 24/08* (2013.01); H04L 2012/40215 (2013.01); H04L 2012/4026 (2013.01)

(58) Field of Classification Search
CPC .......... H04L 12/40; H04L 2012/40215; H04L 2012/4026; H04L 43/0811; H04L 67/12
See application file for complete search history.

(56) References Cited

U.S. PATENT DOCUMENTS 6,330,499 B1   12/2001   Chou et al.
7,398,428 B2 *  7/2008   Hille ...................... H04L 43/50
                                                    714/44
(Continued)

OTHER PUBLICATIONS

Extended European Search Report and Written Opinion issued in European Patent Application No. 22197973.5, dated Jun. 12, 2023, in 09 pages.
(Continued)

*Primary Examiner* — Kostas J Katsikis
(74) *Attorney, Agent, or Firm* — Michael Best & Friedrich LLP

(57) ABSTRACT

A system and method for diagnosing connection and communication in an industrial machine. The electronic processing system includes a CAN bus, an ethernet network, and a plurality of devices connected to the CAN bus and the ethernet network. The plurality of devices includes at least one controller programmed to run one or more software applications. A connectivity check is performed to obtain CAN connection status data and ethernet connection status data for the plurality of devices. The CAN connection status data and the ethernet connection status data is analyzed to determine a likely cause of a device connection issue. A solution to the device connection issue is output to a user based on the analyzed data.

15 Claims, 22 Drawing Sheets

(51) Int. Cl.
*H04W 24/04* (2009.01)
*H04W 24/08* (2009.01)

(56) References Cited

U.S. PATENT DOCUMENTS

| | | | |
|---|---|---|---|
| 7,631,064 B1* | 12/2009 | Gray | H04L 43/0817 709/227 |
| 8,699,356 B2 | 4/2014 | Smart et al. | |
| 9,563,492 B2 | 2/2017 | Bell et al. | |
| 9,765,690 B2 | 9/2017 | Ritter et al. | |
| 10,657,450 B2 | 5/2020 | Ritter et al. | |
| 11,233,713 B2* | 1/2022 | Brinkman | G07C 5/0808 |
| 2008/0186870 A1* | 8/2008 | Butts | H04L 43/0847 370/252 |
| 2010/0082805 A1* | 4/2010 | Orton | H04L 43/0805 709/224 |
| 2012/0041635 A1 | 2/2012 | Johnson et al. | |
| 2015/0347258 A1 | 12/2015 | Du et al. | |
| 2016/0163125 A1 | 6/2016 | Kim | |
| 2019/0120159 A1 | 4/2019 | Brinkman et al. | |
| 2019/0312892 A1* | 10/2019 | Chung | G06F 21/554 |
| 2020/0051347 A1 | 2/2020 | Bohl et al. | |
| 2021/0021497 A1 | 1/2021 | Brinkman et al. | |

OTHER PUBLICATIONS

European Search Report issued in counterpart application No. 20186767.8 dated Nov. 25, 2020 (9 pages).

* cited by examiner

| ECU NUMERICAL DESIGNATION | TLA | CAN Bus # | Error Counts | DTCS | Nominal Voltage | Active Injection Voltage Result | Comparison Expected vs. Responding |
|---|---|---|---|---|---|---|---|
| | Three letter acronym for the specific controller | 1,2,3,4 | RANGE FROM 95-63,500 | LIST – SPN FMI | Normal: 1.5V<=CANL <=2.5V 2.5V<= CANH <=3.5V | Example Error: CANL<1.5V, Or CANH>3.5V Error Could be on one, the other, or both. The 1.5 and 3.5 are not "absolute", but approximate based on normal systems. | ✓ or ✗ |
| 1 | ABC | 1 | 24,000 | | CANL=2.1V, CANL=3.1V | CANL=2.3V, CANL=2.8V | ✓ |
| 1 | ABC | 1 | 24,250 (same ECU, just differing based on time of sample) | | CANL=1.9V, CANL=2.8V | CANL=2.2V, CANL=2.8V | ✓ |
| 2 | BCD | 2 | 63,500 | | | CANL=2.3V, CANH=3.9V | ✓ |
| 3 | GHI | 2 | 350 | | CANL=1.0V, CANL=2.8V | | ✓ |
| 4 | ... | 3 | 220 | | | | ✓ |
| 5 | ... | 3 | 450 | SPN 629 FMI 12 SPN 629 FMI 13 | | | ✓ |
| 6 | ... | 3 | 200 | | | | ✓ |
| 7 | ... | 3 | 95 | | | | ✓ |
| 8 | ... | 4 | No Response | | | | ✗ |
| 9 | XYZ* | 4 | Exception | N/A | N/A | N/A | N/A |

FIG. 5

CAN And Connectivity Health

618 — Display Information From Database For Missing Controller Information In Pop Up Window Source Address Format: ● Decimal ○ Hexadecimal  CAN Channel: CAN 2

| | Status | Device | Source Address | PIN | Function | Manufacturer | Percent Load | Missing Source Addresses |
|---|---|---|---|---|---|---|---|---|
| | ○ | ECU | 0 | | Engine | John Deere | | 3.66 |
| | ○ | BCM | 33 | | Body Controller | John Deere | | |
| | ○ | | 246 | | Vehicle Dynamic Stability Control | AGCO (Formerly AGCO GmbH & Co.) | | |

Missing Controller Information Source Address 3: Transmission #1. ☒

System Health — Connectivity Health — CAN Health

Instructions
Controller Information
CAN Bus Statistics
CAN Streaming

Pause | Clear | Get Percent Load | Get PIN | Create Report

Status Details
Controller Is Indicating A Loss Of Communication With Other Controllers.

Solution
Click On Missing Controller Numbers For Additional Information. Diagnose Active DTCs Per Technical Manual

CONTROLLER AREA NETWORK AND CONNECTIVITY HEALTH TROUBLESHOOTING SYSTEM

FIELD

Various exemplary embodiments relate to performing diagnostic tests to determine the health of electronic and software system components of industrial machines.

BACKGROUND

Modern industrial machines, which can include industrial vehicles (e.g., agricultural, construction, forestry, mining vehicles, etc.) and stationary industrial equipment (e.g. generators, pumps, compressors, etc.) are complex systems that can include numerous Electronic Control Modules (ECMs) and/or units (ECUs). Due to this complexity, diagnosing failures in communication systems (i.e. Controller Area Networks (CAN), Local Interconnect Network (LIN), Ethernet, etc.) is becoming more difficult. Certain industrial machines are equipped with internal diagnostic systems. Internal systems however, may be limited in scope due to size, cost, or performance considerations. Technicians and service centers are often equipped with significantly more robust and sophisticated diagnostic capabilities for other industrial machine systems but not necessarily for CAN and connectivity issues.

The complexity of the systems can result in a technician traveling to the location of the machine and spending a significant amount of time trying to establish or diagnose communication issues instead of addressing the customer's complaint. Additionally, Diagnostic Trouble Codes (DTCs) may or may not be present for issues that can be caused by a network component problem (wiring, termination, etc.) or by a faulty ECM. Technicians often do not have the proper training to diagnose a CAN or connectivity issue at a remote site, and will therefore struggle to eliminate potential causes of a problem. There remains a need to self-diagnose potential issues and step technicians through the troubleshooting process. Improved systems and methods of diagnosis and service of the engine (and entire machines) can reduce the amount of time it takes a technician to resolve issues with communication and connectivity resulting in improved machine uptime and the customer experience.

SUMMARY

An exemplary embodiment includes a method of diagnosing a connection or communication issue with an industrial machine. The method includes connecting to an electronic processing system of an industrial machine. The electronic processing system includes a CAN bus and a plurality of controllers connected to the CAN bus, the plurality of controllers programmed to run one or more software applications. A software check is performed to obtain software data related to the software applications. A connectivity check is performed to obtain connection status data for one or more of the controllers. A CAN bus check is performed to obtain CAN bus data. The software data, the connection status data, and the CAN bus data are analyzed to determine a likely cause of an industrial machine connection or communication issue. A solution to the industrial machine connection or communication issue is output to a technician based on the analyzed data.

According to another exemplary embodiment, an industrial machine connection and communication diagnostic system includes a communication interface and a diagnostic module. The communication interface is configured to connect to an electronic processing system of an industrial machine. The electronic processing system includes a CAN bus and a plurality of controllers connected to the CAN bus, the plurality of controllers programmed to run one or more software applications. The diagnostic module is configured to initiate a software check to obtain software data related to the software applications, initiate a connectivity check to obtain connection status data for one or more of the controllers, and initiate a CAN bus check to obtain CAN bus data. The diagnostic module analyzes the software data, the connection status data, and the CAN bus data to determine a likely cause of an industrial machine connection or communication issue and outputs a solution to the industrial machine connection or communication issue to a technician based on the analyzed data.

According to another exemplary embodiment, an industrial machine connection and communication diagnostic system includes a communication interface and a diagnostic module. The communication interface is configured to connect to an electronic processing system of an industrial machine. The electronic processing system includes a CAN bus and a plurality of controllers connected to the CAN bus, the plurality of controllers programmed to run one or more software applications. The diagnostic module is configured to initiate a controller response check. The controller response check includes determining the number of controllers and the controller layout, request a response from each controller, provide a graphical representation of the controller layout, determine a fault, and display the location of the fault on the graphical representation.

Another exemplary embodiment includes a method of diagnosing a connection or communication issue with an industrial machine. The method includes connecting a diagnostic system to an electronic processing system of an industrial machine. The electronic processing system includes a CAN bus, an ethernet network, and a plurality of devices connected to the CAN bus and the ethernet network. The plurality of devices includes at least one controller programmed to run one or more software applications. A connectivity check is performed to obtain CAN connection status data and ethernet connection status data for the plurality of devices. The CAN connection status data and the ethernet connection status data is analyzed to determine a likely cause of a device connection issue. A solution to the device connection issue is output to a user based on the analyzed data.

According to another exemplary embodiment, an industrial machine connection and communication diagnostic system includes a diagnostic system having a communication interface configured to connect to an electronic processing system of an industrial machine. The electronic processing system includes a CAN bus, an ethernet network, and a plurality of devices connected to the CAN bus and the ethernet network. The plurality of devices includes at least one controller programmed to run one or more software applications. The diagnostic system includes one or more processors and is configured to, initiate a CAN bus check to obtain CAN bus data, initiate an ethernet connection check to obtain ethernet connection data, analyze the CAN bus data and ethernet connection data to determine a likely cause of an industrial machine connection or communication issue, and output a solution to the industrial machine connection or communication issue to a user based on the analyzed data.

BRIEF DESCRIPTION OF THE DRAWINGS

The aspects and features of various exemplary embodiments will be more apparent from the description of those exemplary embodiments taken with reference to the accompanying drawings.

FIG. 5 is a table showing controller response information.

FIG. 13 is a continuation of the missing controller test shown in FIG. 12.

DETAILED DESCRIPTION OF EXEMPLARY EMBODIMENTS

Figure 1:
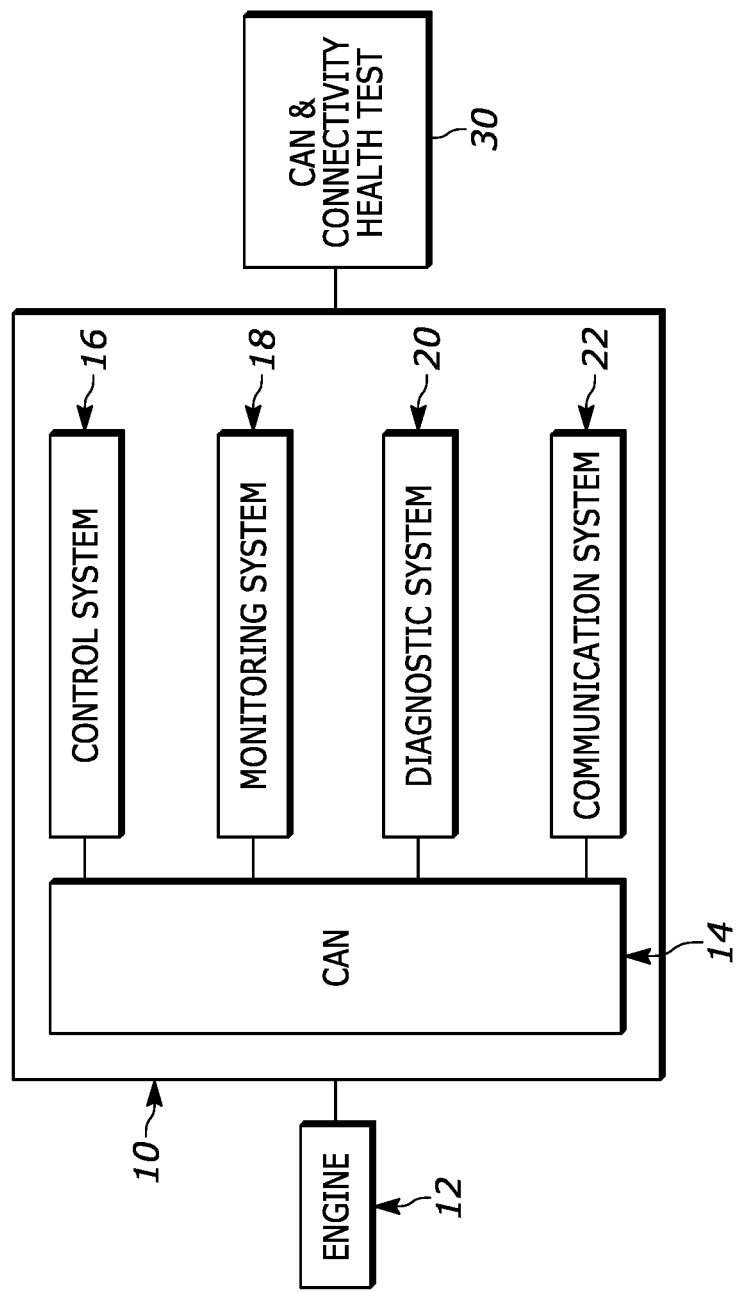
FIG. 1 is a schematic view of an industrial machine electronic system.

FIG. 1 shows an exemplary embodiment of an electronic system 10 associated with an industrial machine. The electronic system 10 can include the different hardware and software components utilized in the operation of the industrial machine. In some embodiments, the electronic system 10 is connected to industrial components 12. In some embodiments, the industrial components 12 can include an engine that is part of a vehicle that contains one or more ground engaging members, for example tires or treads, that are powered by the engine. The industrial components can also include transmissions, HVAC systems, tools or other work implements. Certain embodiments can also be directed to other types of moving or stationary machines that utilize an engine, for example a diesel engine used in a generator.

In the exemplary embodiment shown in FIG. 1, the electronic processing system 10 includes a CAN bus 14 in communication with various components including a control system 16, a monitoring system 18, a diagnostic system 20, and a communication system 22. The electronic system 10 is configured to diagnose or at least partially diagnose different error conditions in the industrial machine.

The electronic processing system 10 can include one or more of a data processor and a data storage component. The electronic processing system 10 can be implemented by a general purpose computer that is programmed with software applications. The CAN bus 14 provides communication between the different components. The control system 16 can include one or more controllers or electronic control units or modules, for example an engine control unit. The control system 16 can include software and/or firmware stored in memory to perform different operations and tasks.

The monitoring system 18 can include various sensors or other measurement devices used to monitor the status of components in the industrial machine. For example, the monitoring system can collect voltage information associated with different sensors, and this information can be compared to stored values in a chart or table. Based on discrepancies between the actual and stored values, error codes or diagnostic trouble codes (DTCs) can be generated, either by the control system 16 or the diagnostic system 20.

The diagnostic system 20 can be configured to perform multiple tasks, including initiating tests and recording errors sensed by the monitoring system 18. The diagnostic system 20 can receive and record, for example through a software module or instructions for analyzing, the results of diagnostic tests, fault codes, error messages, status messages, or test results provided by the monitoring system 18. The diagnostic system 20 can also be capable of analyzing or comparing the information provided by the monitoring system 18 to a database that contains prior information related to the industrial machine and standard operating information. The diagnostic system 20 can record and store data associated with the industrial machine, and transfer that data via the communication system 22 to an output, for example a local output and/or a remote location. A local output can be a screen or other user interface associated with the system 10 or a user access device that is connected to the system, for example through a hard wired electronic data link connection (e.g., SAE J1939/USB), or through a wireless connection (e.g., Wi-Fi, Bluetooth, or other near field communication). A remote location can include transferring data via the communication system 22 over a network to a dealer or service center.

Locally, the information can be processed by an access device, such as a technician computer. The technician may also be able to access a controlled menu via an onboard computer system. At a remote location, the service center can receive the transmitted data and then process the data to provide a recommendation to a technician. The data can be processed by one or more data processing systems that can include a server, central processing unit, software modules or programmable logic, and electronic memory. In certain instances, the recommendation identifies a reduced number of potential sources of the problem from the maximum potential sources to allow the technician to carry fewer parts or less equipment when visiting a location. The diagnostic system 20 also may be capable of producing, storing, or communicating DTCs.

The electronic processing system 10 can utilize other components including processors, data storage, data ports, user interface systems, CAN buses, timers, etc., as would be understood by one of ordinary skill in the art.

The communication system 22 is configured to locally and remotely communicate information over a communication network. The communication system 22 can provide communication over different wired connections (e.g., SAE J1939), wireless systems and networks (e.g., mobile, satellite, Wi-Fi, near-field, Bluetooth), or a combination thereof as needed. In some embodiments, the communication system 22 can include or interact with a Vehicle Communication Interface (VCI). For example, the communication system 22 can include a diagnostic connector on the machine which is accessible to a user. The user can connect to the diagnostic connector with a diagnostic plug that connects to a VCI system which can then transfer information to a user's diagnostic tool, such as a PC, laptop, tablet, or other computing device.

In some embodiments, the communication system 22 includes a telematics system. The telematics system includes, for example, a network of regional, national, or global hardware and software components. In addition, the telematics service may be provided by a private enterprise, such as an independent third-party company that provides the service to other companies, a manufacturing company that provides the service to its customers, or a company that provides the service to its own fleet of vehicles. Alternatively, the telematics service may be provided by a governmental agency as a public service. JDLink™ is an example of a telematics service, which is available from John Deere & Company.

According to an exemplary embodiment, the diagnostic system can include a CAN and connectivity health test (CCH) 30 that helps a technician troubleshoot complex controller network connectivity and communication issues. Problems can be caused by hardware, software, and/or operating state of the industrial machine components. Examples of such issues include faulty CAN signals, noisy controllers, and poor connections. Technicians often do not have the proper training to diagnose a CAN or connectivity issue and will therefore struggle to eliminate potential causes of a problem. Various exemplary embodiments are directed to being able to help a technician more efficiently troubleshoot these issues.

In some embodiments, the electronic system 10 can have CCH 30 capabilities built in, for example in the diagnostic system. In some embodiments, the CCH 30 capabilities are included in a diagnostic module. The diagnostic module could be a physical device, or in the technician's service tool/laptop, or a software application or utility, or in an operator display on the machine. In some embodiments, the CCH 30 capabilities are included in a remote system such as implemented via a computer web interface or dashboard. In some embodiments, the CCH capabilities are included in communication devices such as cell phones and tablets.

In one exemplary embodiment, the CCH 30 checks that the technician laptop and service tool software application has all of the files, software, components, drivers, etc. needed to successfully connect to and communicate with a machine. In this embodiment, the CCH 30 also checks that a Vehicle Communication Interface (VCI) is connected to the technician laptop via USB, Bluetooth, or Wi-Fi, connected to the machine via a diagnostic connector, and able to communicate with the machine CAN bus. The CCH 30 also checks the CAN bus to detect hardware or wiring issues that need to be repaired, controller issues that need to be addressed, or communication issues such as Bus loading, interfering devices, intermittent issues, etc.

Various exemplary embodiments can also include checking that the electronic system, diagnostic module, remote system, or communication devices described previously have all of the files, software, components, drivers, etc. needed to successfully connect to and communicate with a machine.

The specification references CAN for consistency, but CAN is only an example, and the methods described can readily apply to CAN, Wired Ethernet, LIN, Wi-Fi, and other technologies. Additionally, some examples described herein refer to capabilities of the SAE J1939 and ISO 11783 CAN-based communications protocols, but the methods are applicable to other protocols in addition to other physical layers (CAN v. Ethernet).

Figure 2:
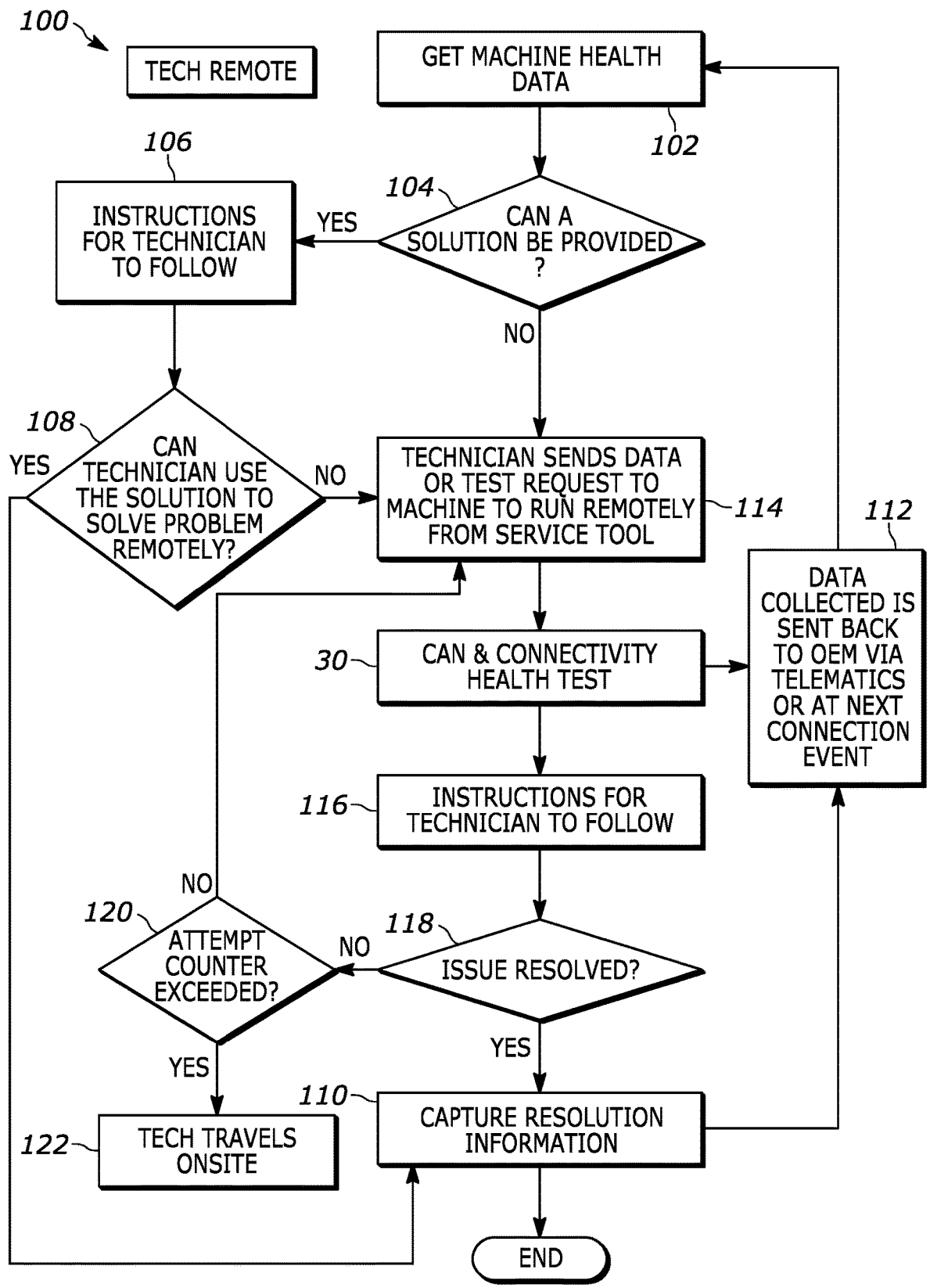
FIG. 2 is a flow chart illustrating a remote industrial machine diagnostic procedure.

FIG. 2 shows an exemplary embodiment of a remote diagnostic procedure 100 that utilizes a CAN and connectivity health test system and method 30 (CCH). The CCH 30 can be configured to perform multiple tasks, including initiating tests and recording data associated with the electronic processing system 10. The CCH 30 can be a diagnostic module (hardware or software) configured to receive and analyze data from the electronic processing system 10, for example through a software module or instructions for analyzing, the results of diagnostic tests, fault codes, error messages, status messages, or test results provided by the electronic processing system 10. The CCH 30 can also be capable of analyzing or comparing the information provided by the electronic processing system 10 to a database that contains prior information related to the industrial machine and standard operating information. The CCH 30 can also include memory for storing and archiving data.

The CCH 30 includes a communication interface for connecting to and communicating with the electronic processing system 10. The communication interface can include wired and wireless connections capable of local and/or remote outputs. A local output can be a screen or other user interface associated with the CCH 30 or a user access device that is connected to the system, for example through a hard wired electronic data link connection, such as a 9-pin connection, or through a wireless connection such as Wi-Fi, Bluetooth, or other near field communication. A remote location can include transferring data over a network to a dealer or service center.

Locally, the information can be processed by an access device, such as a technician computer. The technician may also be able to access a controlled menu via an onboard computer system. At a remote location, the service center can receive the transmitted data and then process the data to provide a recommendation to a technician. The data can be processed by one or more data processing systems that can include a server, central processing unit, software modules or programmable logic, and electronic memory. In certain instances, the recommendation identifies a reduced number of potential sources of the problem from the maximum potential sources to allow the technician to carry fewer parts or less equipment when visiting a location.

The CCH 30 can utilize other components including processors, data storage, data ports, user interface systems, CAN buses, timers, etc., as would be understood by one of ordinary skill in the art.

This diagnostic procedure can be performed at a remote location using data sent over a network. When a user (e.g., service dealer, technician, etc.) learns of a problem with an industrial machine, they can initially retrieve the machine health data (step 102). In some embodiments the machine has telematics available which sends machine health data on a regular basis to a data center or other automated system.

The machine health data can be used for manually or automatically creating a solution (step 104) that is then sent to the dealer technician to aid in the diagnosis/repair.

If a solution is provided, the technician is given instructions to follow (step 106). If the solution is used to solve the problem remotely (step 108), resolution information is captured (step no) and sent to the original equipment manufacturer (OEM) for analytics (step 112). Remotely can mean that the technician is offsite from the machine and is connecting to the machine via cellular, satellite, or other possible means of communication. An example of a solution that can be performed remotely might be a software update to a controller or other device that resolves the issue. It could be delivered automatically via a delivery system (to one or many machines), or an alert is sent to the dealer and the update is sent by request of the OEM or service center.

If a solution is not provided or the issue is not resolved, the technician sends a request (step 114) to run the CCH 30 remotely from the service tool. The CCH 30 can be initiated remotely or via a hardwired connection at the machine. For example, the technician may need to be at the machine to determine if it is in a safe state for the test to be performed, or it may require parts replacement or other repairs to be completed before the test is performed. The CCH 30 collects available data and performs analysis of results as discussed in further detail below. The CCH 30 provides a solution output (step 116) which can include instructions or next best action for the technician to follow. These instructions can be either the next steps listed that reside in the CCH 30 and/or it can be a link to a support portal. The support portal can include a document with steps for the technician to perform. The support portal can also provide access to information in a database. The support portal can also include a real-time monitoring center. The support portal can be an interactive system that allows the CCH 30 or technician to provide input, to which the interactive system provides changing steps based on the input. The technician may be able to solve the issue (step 118) based on those results. If the issue is resolved the information is captured (step 110) and sent to the OEM (step 112). Resolution feedback can be log files, manual feedback (multiple choice), auto feedback, etc. An example could be that the CCH 30 determines if a part was replaced, software was updated, wiring was repaired, etc.

If the issue is not resolved, the technician has the opportunity to rerun the process remotely until either the issue is resolved or an attempt counter is exceeded (step 120). Once the attempt counter has been exceeded, technician is directed to travel to the machine (step 122).

Figure 3:
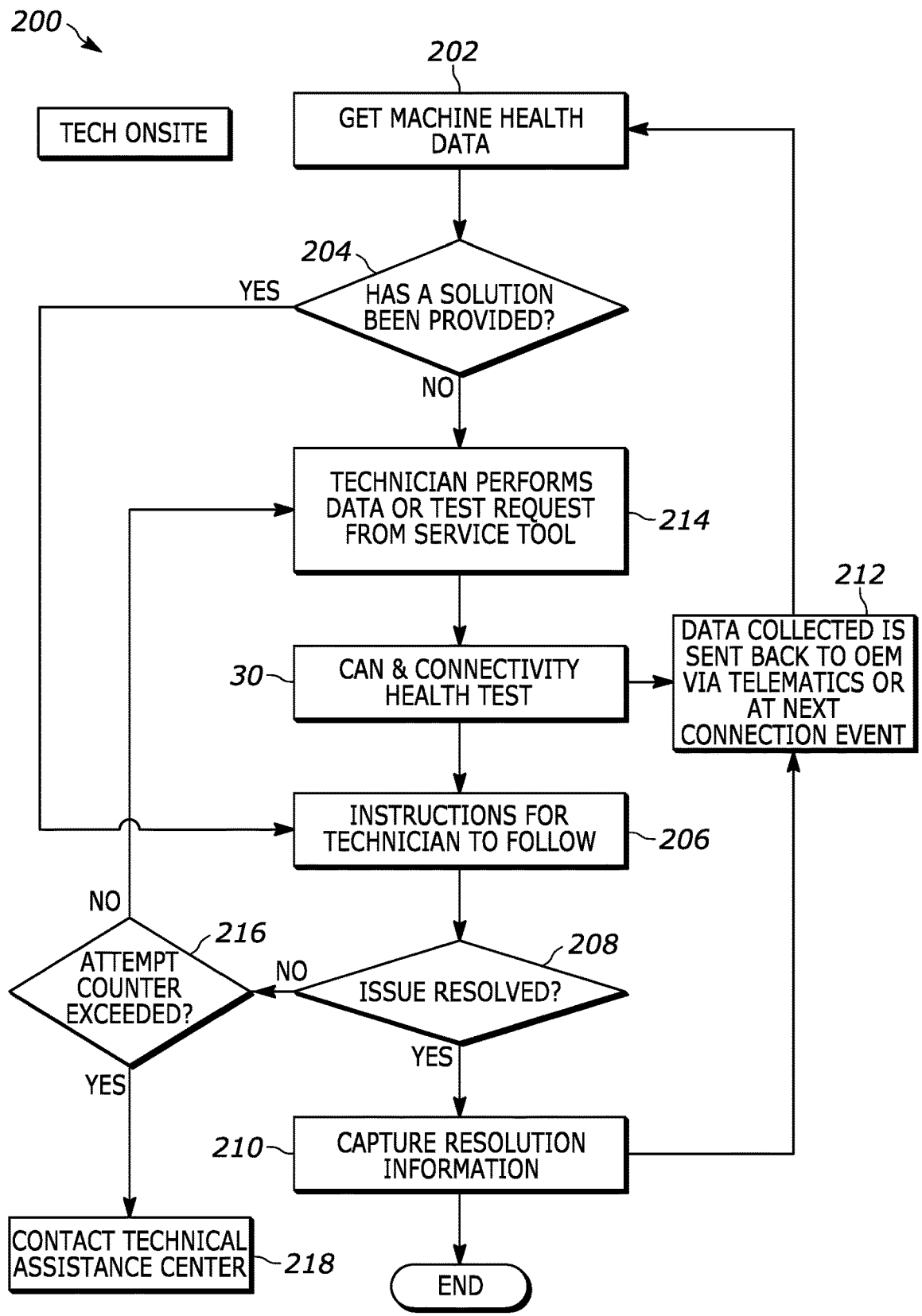
FIG. 3 is a flow chart illustrating an on-site industrial machine diagnostic procedure

FIG. 3 shows an exemplary embodiment of an onsite diagnostic procedure 200 that utilizes the CCH 30. At the machine, onsite machine health data is analyzed (step 202). The onsite machine health data can include the existing data received remotely (step 102) as well as any new or updated data. The data is used to create a new solution (step 204) either manually or automatically that is sent to the technician to aid in the diagnosis/repair. If a solution output (step 206) is provided, the technician is given instructions to follow. For example, during an attempt to program an engine controller, it may be possible that another controller is not following network protocol and is overloading the bus or not responding to a bus quiet command. The controller therefore may need to be physically disconnected while the engine controller is reprogrammed. If the solution is used to solve the problem (step 208), resolution information is captured (step 210) and sent to the OEM for analytics (step 212).

If a solution is not provided or the issue is not resolved, the technician sends a request (step 214) to run the CCH 30 while connected (blue tooth, Wi-Fi, hard wired, etc.) with the service tool or diagnostic software program. The CCH 30 may or may not be an identical test and analysis when initiating remotely versus a hardwired connection at the machine as described previously. The CCH 30 collects and analyzes available data to provide instructions or the next best action for the technician to follow (step 206). An example of this scenario is the service tool or diagnostic software program is missing connectivity files or application components necessary for proper operation. The technician may be able to solve the issue based on the output from the CCH 30. If the issue is resolved the information is captured (step 210) and sent to the OEM (step 212).

If the issue is not resolved, the technician has the opportunity to rerun the process until either it is resolved or an attempt counter is exceeded (step 216). Once the attempt counter has been exceeded the CCH 30 directs the technician to contact the Technical Assistance Center for further troubleshooting assistance (step 218).

When the CCH 30 is activated, all data collected by the troubleshooting system and/or the technician can be bundled and sent back to the OEM from the service tool to be analyzed and compiled to create possible new solutions. The CCH 30 can include a database that is updated for redirecting the technician to the next best action. The technician is also prompted to provide feedback regarding whether the solutions helped resolve the issue. This data is captured and bundled with the aforementioned data.

Figure 4A:
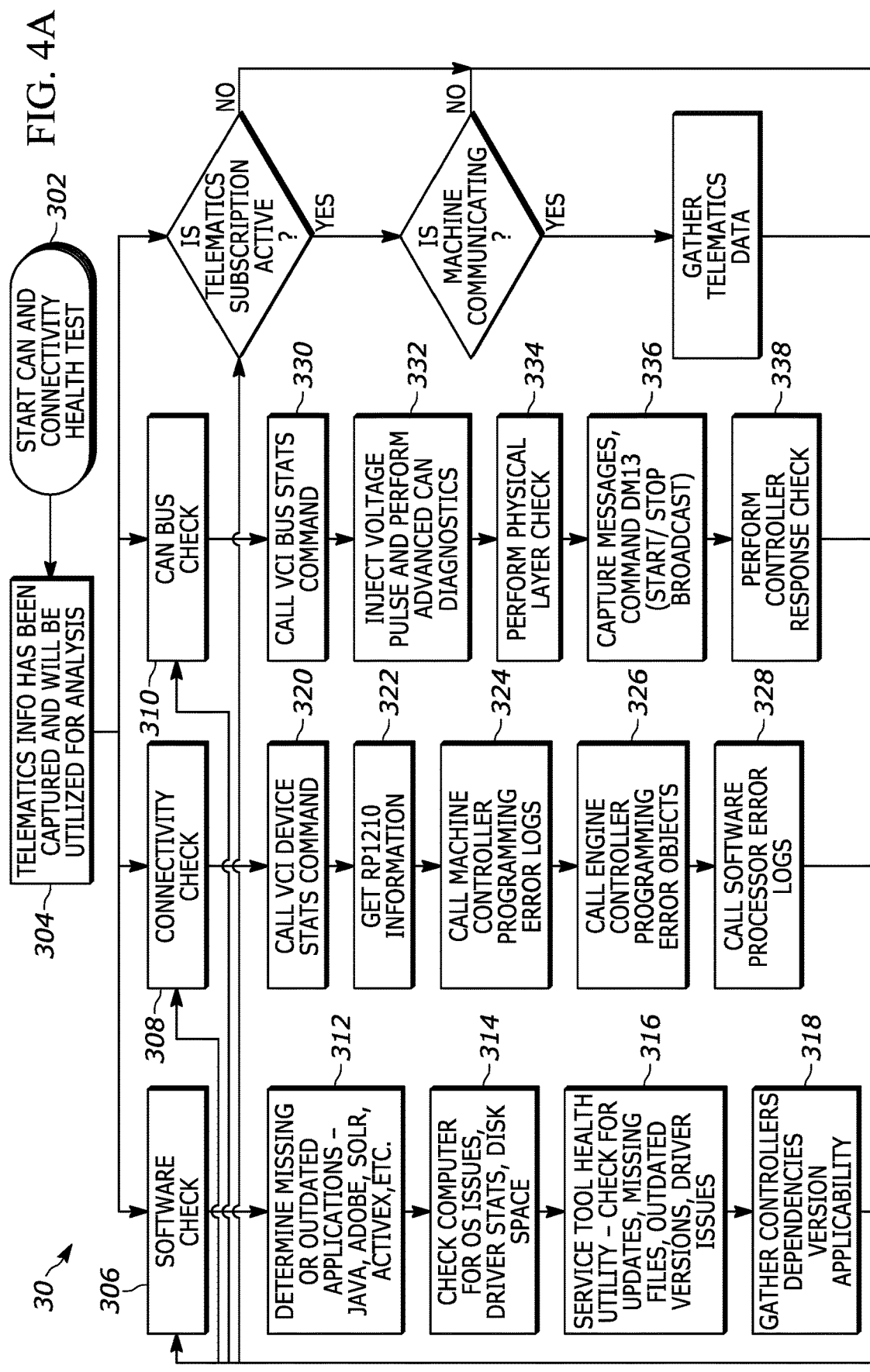
FIG. 4A is a flow chart illustrating a CAN and connectivity health test system and method.
Figure 4B:
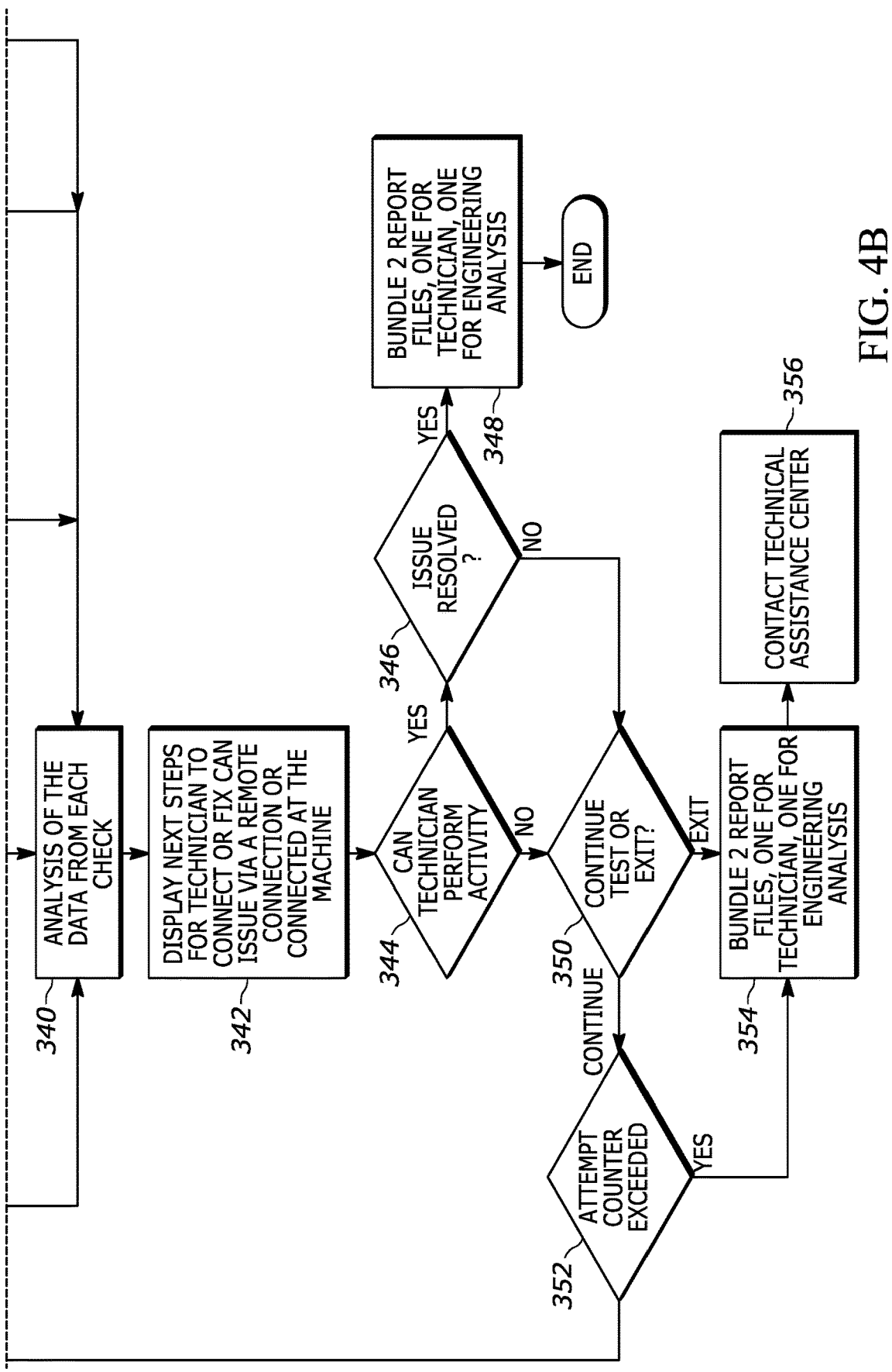
FIG. 4B is a continuation of the flow chart of FIG. 4A.

FIG. 4 shows a schematic of an exemplary embodiment of the CCH 30. In this description the term "CAN bus" is used but it is understood this refers to all types of communication systems (i.e. CAN, LIN, Ethernet, etc.).

When the CCH 30 is initiated (step 302) that machine telematics info is acquired (step 304) either from the machine or from a local database from stored information that has been captured and will be utilized for analysis. The telematics data can include: data shifts over time, sudden shifts in the data, data exceeding a threshold, data compared to other similar machines, etc.

The CCH data acquisition and analysis is split into three main components: software/computer check (step 306), connectivity check (step 308), and a CAN bus check (step 310). The software check (step 306) determines if there are any software, system, or computer problems causing the issue. The connectivity check (step 308) checks the connected status of various tools (e.g., a VCI) and/or other onboard components and methods of connectivity. The CAN bus check (step 310) determines if there are issues or problems with the CAN bus. The CCH 30 refers to a continuously updated database that can be maintained by the service tool development group to ensure components, software, and files are current in the diagnostic system or module, and/or on a machine.

The software and computer check (step 306) diagnoses and troubleshoots the software and systems needed to support proper service tool operation. A check for supporting applications or software for the service tool comprise (but not limited to) determining if there are any missing or outdated applications (step 312) such as, JAVA, Adobe, SOLR, ActiveX, or other software technologies as may be commonly employed. For example, multiple copies or versions of JAVA can cause conflicts that prevent proper service tool operation. If multiple versions are detected, then an error is generated as a conflict using registry keys or other software detection and registration methods, and then links are provided to the appropriate solution database or a knowledge base article that explain how to resolve the issue.

A computer check (step 314) includes checking for computer operating system issues, Vehicle Communication Interface (VCI) driver installation, overall versioning issues, adequate hard drive/RAM space, USB or other physical port drivers, computer battery charge level, etc. One example of the software check being utilized is when the VCI is not responding. The troubleshooting system and method determines that there is a missing file or driver and directs the user to a solution database and a knowledge base article explaining how to resolve the issue. In an example, if the RP1210 (Programming interface recommended practice) software installation failed during the service tool upgrade, a user can be instructed to run a stand-alone installer to resolve the issue. The user is instructed to uninstall the software and reinstall it with the executable file from a link in a knowledge base article. In some instances, the file will be downloaded and installed automatically. Another example is if any file is missing, conflicting, or mismatched, the error reporting is performed which then links to the appropriate solution database or knowledge base article to download the correct or missing file automatically or manually.

A service tool application health check (step 316) includes checking for necessary software version, updates or conflicts, driver updates or issues, missing files, etc. Software and driver updates could include base software updates, enhancements, and defect repairs, etc. Missing files or outdated versions could include necessary files such as Dynamic Link Library (DLL), INI, RP1210, Binary (BIN), Open Diagnostic eXchange (ODX), eXtensible Markup Language (XML), etc. This check is done by comparing the files to a metadata or xml file that is updated for every service tool software release. The xml file is also saved locally on the user's device for use when no Internet connection is available, and is updated at each new service tool software release.

A machine controller software check (step 318) includes determining if there are dependencies between different controllers for reprogramming, connecting, or other activities. It can also include checking for software version applicability and compatibility.

Applicable software check tasks are run in the background without user intervention such as CPU usage, RAM, USB port availability, etc. The software check tasks are also user initiated due to the time required to perform them, such as file compatibility checks.

The connectivity check (step 308) is used to diagnose and troubleshoot the sub-processes and tools needed to support proper service tool operation.

A VCI hardware status check (step 320) can be performed directly at the device or through a communication interface such as RP1210 (step 322). This can include a check of the VCI power source to the device. For example, the VCI may have become unplugged from the vehicle diagnostic connector, so the user is instructed to check the connections. The VCI version can also be checked. For example, the user may be attempting to program a controller with version 1 of a VCI, and version 3 is required due to updates for a new vehicle or engine. The VCI readiness can also be checked. For example, a ready status, and battery voltage is determined, and if it is too low, the user is instructed to connect a battery charger to the engine or vehicle. Based on the results of these checks, a solution may be provided to the user directly from the troubleshooting system and method, or the user is provided a link to the appropriate solution database or a knowledge base article that explains how to resolve the issue.

A check for available error logs/information (step 324) from the application responsible for machine (non-engine) controller software programming is performed. In this step, the system captures error information from the controller programming application. There are two types of errors, one from the component itself or its logs, and the other from a the primary software program which provides overall guidance and execution of configuration, calibration, and/or programming of one or more ECMs in a system, which further provides customization of the standard process to meet the needs of specific ECMs or systems. The system identifies the type of error and provides the user a link to the appropriate solution database or knowledge base article that explains how to resolve the issue. The appropriate solution database or knowledge base article can include error identification, for example recognized by an error numbering system or other identification system. The database also includes a description and potential solution to the problem or next best action.

A check for available error logs/information (step 326) from the application responsible for engine controller software programming is performed. In this step, the system captures error information from the engine controller programming application using an Application Programming Interface (API). The user is provided a link to the appropriate solution database or a knowledge base article that explains how to resolve the issue.

A check for available error logs/information (step 328) from the application responsible for processing the controller software is performed. Based on software type, the system calls lower level programming components like the engine and machine controller programming applications to obtain appropriate data.

The CAN bus check (step 310) determines if there are hardware or wiring issues that need to be repaired, controller issues that need to be addressed, or communication issues such as bus loading, interfering devices, intermittent issues, etc. The CAN bus check (step 310) can call the VCI status from the VCI (step 330) via a request and check, for example, bus or network statistics, baud rate, bus loading, error frames, controller address claim conflicts, and service tool address claims.

The system can also initiate a voltage pulse and perform Advanced CAN Diagnostics (step 332). This can include determining error counts and CAN bus voltage levels with a controlled impedance. An example of this is disclosed in U.S. Pat. No. 8,699,356, the disclosure of which is hereby incorporated by reference in its entirety.

A physical layer check (step 334) can be performed that check for the proper voltage, proper termination resistance value, and other physical layer attributes. A message check (step 336) can also be performed. Messages are transmitted and received and a "Start/Stop broadcast" command DM13 (referenced in SAE J1939 communications) is used and checked for effectiveness.

Additionally, the CAN bus check (step 310) can perform a controller response check (step 338). In the controller response check (step 338), the system will obtain the vehicle and/or engine serial number automatically or via user input. This information is used to query the appropriate controller databases to determine the number of controllers, which communication network each utilizes, and their layout. Additionally, the CCH 30 requests a response from all controllers on the network to compare the list based on actual responses with what is expected based on the database query.

A table can be compiled which includes the troubleshooting information from the controller responses, as shown, for example, in FIG. 5. The information includes: the controller number and its acronym and the specific CAN bus the controller is on (e.g., CAN bus 1, 2, 3, or 4); error counts, defining a noise threshold beneath which it is considered "acceptable noise" in the data, which may be an absolute count, or it may be defined as a small percentage of the total errors (an ECU with an error count above the noise threshold can identify an issue with a harness and/or stub connection from the ECU to the nearest splice or connector); DTCs present for that controller (e.g., SAE J1939 defined suspect parameter number (SPN) and failure mode identifier (FMI)); the nominal voltage reported by each controller for the system voltage (typically 12 or 24V); the Nominal voltage reported by each controller for CAN voltages (typically 2.5V); voltage reading at each controller as a result of an Active Voltage Injection test; and a comparison of controllers expected on the communication network from the database query versus the list of controllers responding to an address claim request or other response command. Controller XYZ shown in the table represents a controller that does not provide error counts or DTCs and is considered an exception. The XYZ controller is displayed in the table but does not provide troubleshooting information for diagnosis. It may or may not be possible to query which CAN bus it is on and it may or may not provide an address claim. An example of this may be a joystick without diagnostics.

Figure 6:
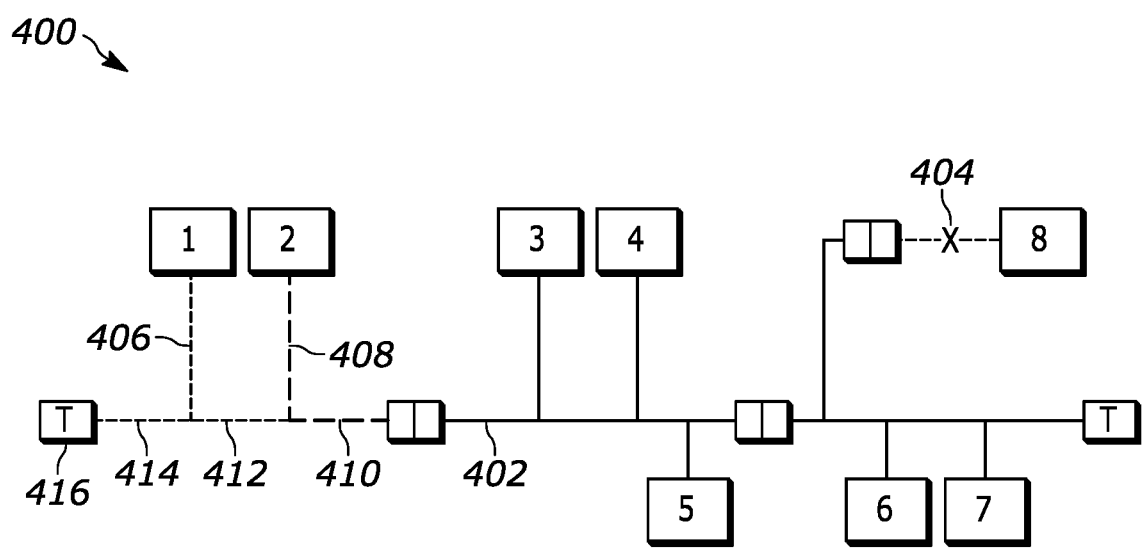
FIG. 6 is a schematic depicting a graphical representation of a controller layout.

The user can then be provided with a graphical network topology 400 of the controllers, an example of which is shown in FIG. 6. When a CAN bus issue has been identified, a user interface displays a graphical representation of the network and the location of the failure is displayed. The available information (error counters, DTCs and voltages) may be used individually, or in combination, to communicate to the user the most likely location on the topology where the fault can be found. For example, error counters alone may cause highlighting of the CAN wiring near an ECU, whereas the error counters in combination with voltage measurements may be indicative of a ground wiring issue to a specific ECU. Highlighting of the network segments may be accomplished in several or multiple ways to indicate the relative error rate for that segment; for example, with line thickness, colorization or other methods.

In an example, the CCH 30 performs the Advanced CAN Diagnostics tests on the network as discussed above (only error counters are described here). A scale is defined from minimum errors to maximum (e.g. 95 to 63,500). Where there is an order of magnitude or more between the minimum and the maximum, there can be a defined threshold, beneath which it is considered "acceptable noise" in the data (e.g. 10%=>635) and is not highlighted in any way 402. For each ECU that failed to respond, the harness stub is highlighted 404, and it is flagged as broken. For each ECU with an error count about the noise threshold, the harness stub from that ECU to the nearest splice or connector is highlighted 406, 408 based on its error count. For each segment 410, 412, 414, the segment is highlighted 412, 414 to the most severe level of any connected segment or stub 406, 408 based on the error count report from the ECUs 1, 2. The highlight may be extended to a segment 414 for which specific error count data may be unavailable, for example the segment connecting the CAN terminator 416.

Additionally, the schematic may be updated in real-time, which may then be influenced by machine vibration, and/or the technician may move about the machine and flex the harness, which could induce additional error behavior when the flex is local to the fault (e.g. an intermittent connection in a connector).

Returning to FIG. 4, after one or more of the checks 306, 308, 310 are performed, information is gathered and analyzed (step 340) and the user is provided a link to the appropriate solution database or knowledge base article that explains how to resolve the issue (step 342). For the three main checks 306, 308, 310, analysis of data from each is used to display the next steps for the technician to connect or fix the CAN issue via a remote connection or direct connection at the machine (step 342). This may include a solution that appears directly in the troubleshooting system and method, linking to the appropriate solution database or knowledge base article that explains how to resolve the issue, fixing the issue automatically, or directing the user to contact support for additional troubleshooting or resolution actions. In addition to identifying a Diagnostic Trouble Code, an error number, or other identifier, it can also provide a detailed description of the code or error and the solution to resolve it or the next best action or steps the user can take to resolve it. The CCH 30 can also include cognitive searching for finding solutions. For example, the problem contains "DLL", "JAVA", etc. and the CCH 30 searches for those words or phrases in a database to create or provide a solution.

A CAN traffic log is also collected and included in the return file for further analysis. Each of the steps can be performed independently or simultaneously (automatically or user selected). Troubleshooting decisions can be determined by the technician, or automatically by the CCH 30, to complete the repair process.

After receiving the next steps (step 342) the technician determines if they can perform the activity (step 344) and takes further action. If the technician can perform the activity, it is next determined if the issue is resolved (step 346). If the issue is resolved, a report is created and a copy is provided to the technician and to the OEM for analysis (step 348). If the technician cannot perform the activity or if the issue is not resolved, the technician has the opportunity to rerun the process (step 350) until either the issue is resolved or an attempt counter is exceeded (step 352). Once the attempt counter has been exceeded a report is created and a copy is provided to the technician and to the OEM for analysis (step 354) and the technician is instructed to contact technical assistance for further instructions (step 356).

The CCH 30 can also be integrated with, and supports, machine health systems and processes which can include additional data collection, analysis, and solution delivery. For example, vehicle, machine, and engine data can be collected via Telematics (e.g., CAN bus error counts, computer statistics, etc.). Service tool usage data and metadata can also be collected (e.g., data collected from technicians solving similar connectivity or CAN bus issues). Data can also be collected from other systems, including warranty, technical assistance center, software repository, etc. (e.g., warranty claims, support cases, software download data that lead to problem recognition and resolution, etc.). Some of the analysis performed can include automated data analysis to determine solution or next best action and manual data review (e.g., engineering or technical assistance center reviews and provides solution, etc.). The solution deliver system can include automated delivery (e.g., John Deere Connected Support™ Expert Alert for a CAN or connectivity issue that is created based on the data collection and analysis and delivered to a Service Dealer or technician) or manual delivery (e.g., phone, email, text message, etc. from a technical assistance center or dealer to provide a solution to a problem).

The CCH 30 can also be integrated with, and supports ECMs and ECUs with internal diagnostic and test capabilities. This includes controllers with the hardware and software required for Advanced CAN Diagnostics such as error counts, voltage monitoring, and fault injection. The CCH 30 can perform some level of Advanced CAN Diagnostics, if the controllers do not contain the additional hardware and software, by using voltages measured by the VCI and sending the appropriate commands from the service tool. If the controllers contain the additional hardware and software, the CCH 30 can send commands for the controllers to perform the diagnostics and return the results to the service tool.

Controllers with interactive tests and diagnostics such as those used for AUTomotive Open System ARchitecture (AUTOSAR) and Unified Diagnostic Service (UDS) and On-Board Diagnostics (OBD) protocols are also included. The CCH 30 can send the commands to the controllers to perform software, connectivity, and CAN bus diagnostics, and they can include and return the results to the service tool.

The CCH 30 can incorporate additional checks not shown in FIG. 4. For example, an additional machine controller software check can include determining if there are dependencies between different controllers for reprogramming, connecting, or other activities and checking for software version applicability and compatibility. If the CCH 30 detects a connectivity issue that could be resolved by a software update to a controller, it could initiate the download and programming procedure, following all appropriate safety and security measures. An additional connectivity check can test for a Wi-Fi connection, its speed, signal strength, security, etc. between any service tool and interface device. For example, the connectivity check tests Wi-Fi between a laptop and a VCI. Another example includes a Wi-Fi connectivity check between a service tool and a Wi-Fi supported machine controller(s).

In some embodiments, electronic controllers have the built-in capability to perform self-diagnostics for connectivity and CAN bus issues. The data from those diagnostics are accessed and bundled, returned for analyses, troubleshooting and feedback. Additionally, the controller initiates additional abilities such as sending troubleshooting or error information to a display, service tool, or other interfacing device. Diagnostics incorporated into the controllers on the machine run manually or automatically and provide additional data to help resolve the issue. An example of this scenario is one where the controller has Advanced CAN Diagnostics and detects a nominal voltage shift as discussed in further detail in U.S. Pat. No. 8,699,356.

In some embodiments, the health checks are performed automatically without user initiation either via remote capabilities (such as telematics) or anytime the service tool is connected directly to the machine. Alternatively, some unobtrusive diagnostics are performed in the background automatically while others are run by user selection or as guided by analytics. The data collected and the analysis performed can also be updated in real time.

In some embodiments, the CCH 30 can be configured to turn off other controllers (mute them) and determine/isolate a faulty controller before the technician travels to the machine with parts. The CCH 30 can also capture "freeze frame" data, which provides the current state of the engine/machine/vehicle (i.e., a snapshot of parameters at the time a DTC occurs). Freeze frame data can be provided as either a preselected list or all available data, that can be used to automatically or manually analyze an issue, and to provide the next best action or solution the user can take to resolve the issue. For example, if a CAN bus related DTC occurs, the CCH 30 can capture freeze frame data such as CAN error counts, CAN line voltages, and any missing messages.

An additional scenario is where the service tool is embedded into the machine itself, the operator may activate the tests, and see the results on the built-in display. The data collected may be cached for later transmission back to the process as previously described.

The CCH 30 can also be used for other network communication or protocol standards (i.e., LIN, Ethernet, RS-232, J1939, Ji708, J1850, ISO15765, ISO9141, or KWP2000, etc.) where voltage measurements, error counters, or fault-injection techniques are applicable. In some embodiments, a request for data such as DTCs, or a recording of machine parameters, or another type of data request could be sent to the machine to provide additional troubleshooting information.

In certain embodiments, the CCH 30 can perform a reprogram readiness test for a controller and an analysis of a controller reprogram failure. A ready to program test can be performed prior to a reprogramming event to identify or eliminate errors before reprogramming. A reprogram test can be performed if a user is experiencing issues with controller reprogramming. The reprogram test checks for problems which can cause reprogramming issues, such as high bus loading, and identify such problems. If there is still an unsuccessful reprogramming event, the CCH 30 will analyze the failed reprogramming attempt and make recommendation for a solution. For example, the CCH 30 can compile and extract errors (e.g., ECU Lost, preservation file corrupt) from log files to show specific errors and solutions. Error information may also be obtained directly from the component, for example through a dynamic link connection to the component that provides updated error information.

Figure 7:
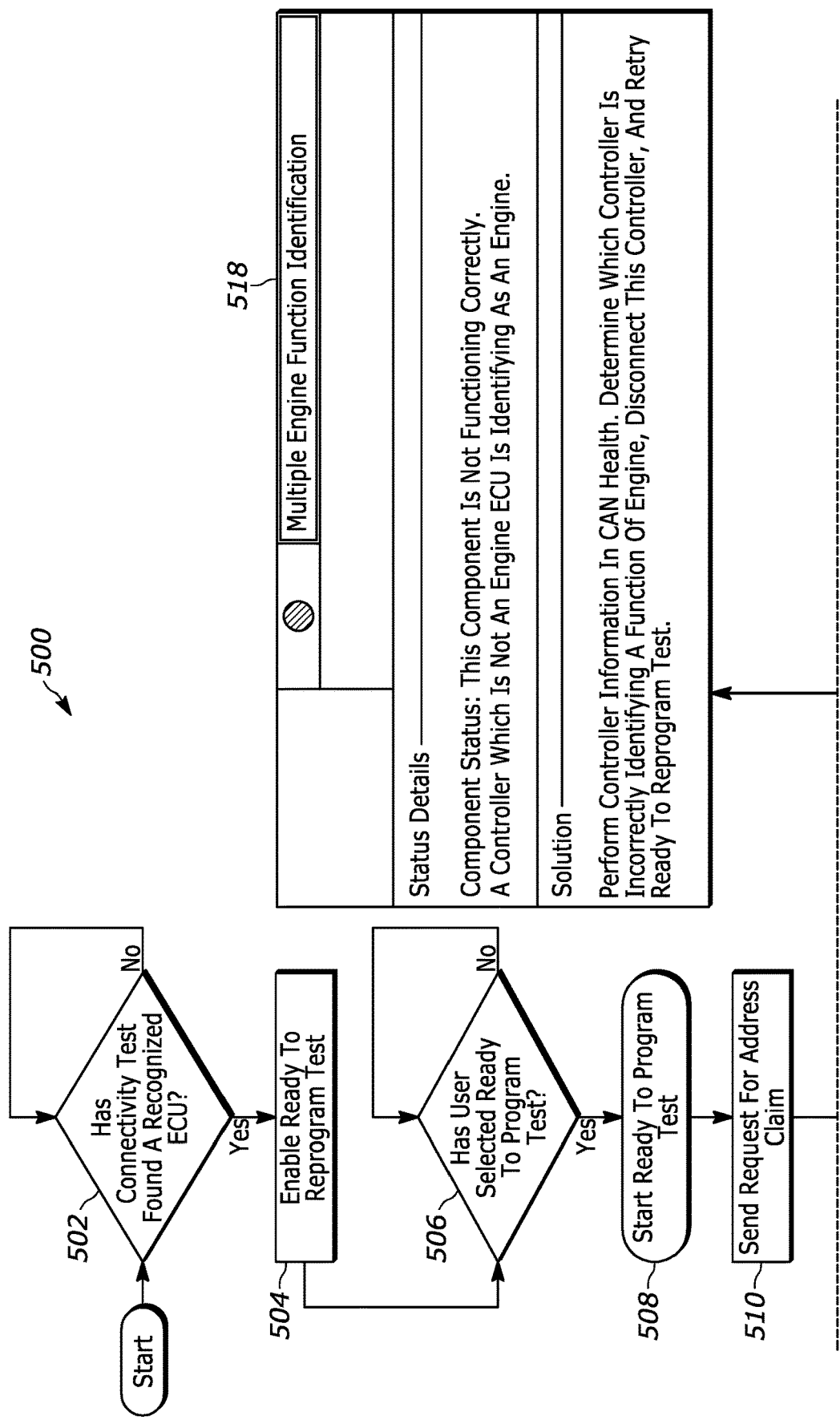
FIG. 7 is a flow chart illustrating a controller program readiness test.
Figure 8:
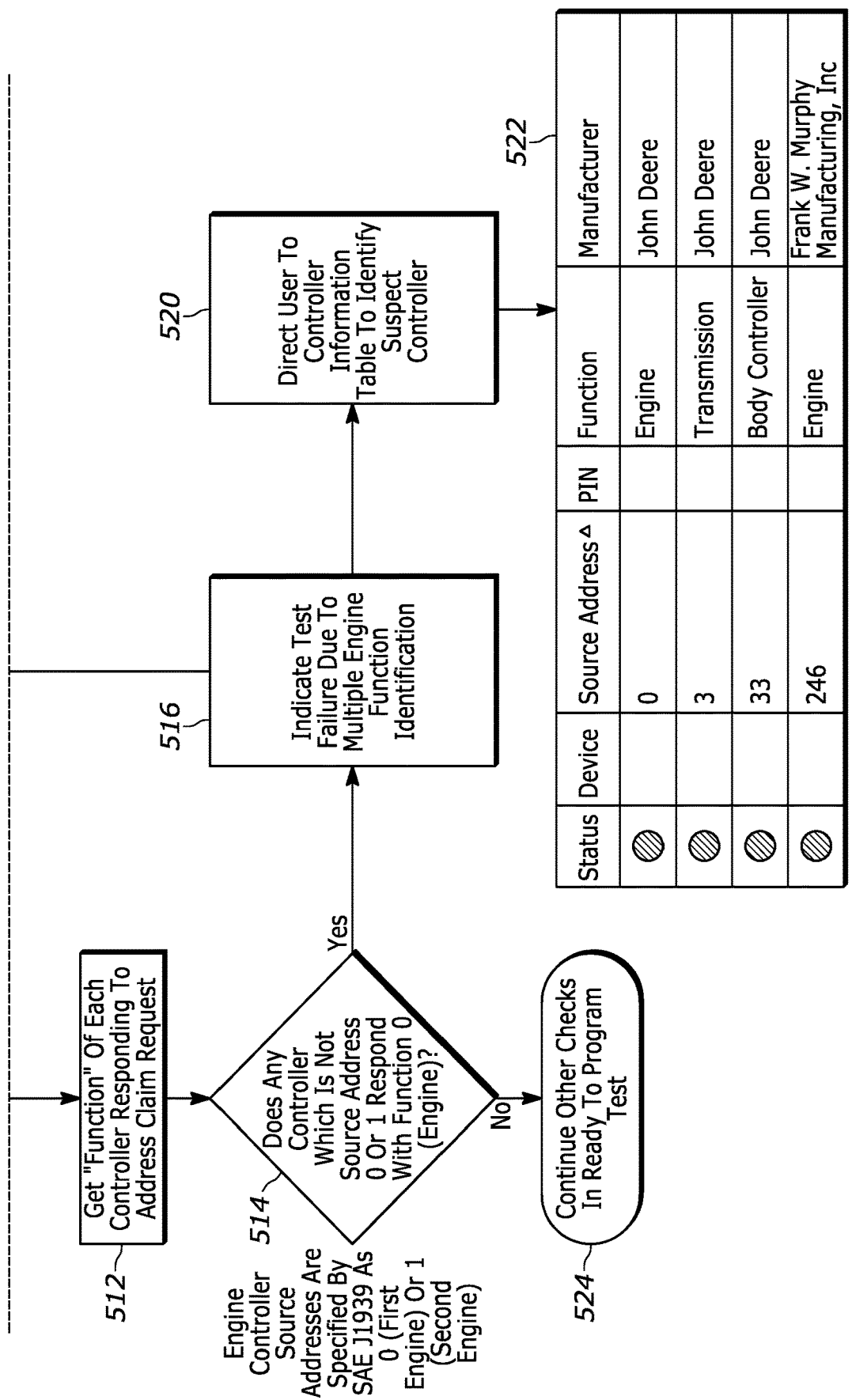
FIG. 8 is a continuation of the controller program readiness test of FIG. 7.

FIGS. 7 and 8 show an exemplary embodiment of a Ready to Reprogram Test 500. After the CCH 30 has found a recognized a controller 502, the Ready to Reprogram Test 500 can be enabled 504. A user desiring to perform a reprograming event can select the Ready to Reprogram Test 506 which is then initiated 508. The Ready to Reprogram Test 500 sends a request for the address claim 510 of the controller. The test then acquires the function of each controller that is responding to the address claim request 512. The function of different controls can have different set responses, and the test can determine if any of these controllers are not responding properly. The test will then analyze the responses to determine if any controller is not responding properly 514. For example, a primary engine controller can have an address specified as a 0 in the system architecture. If any controllers are responding with a 0 address that are not primary engine controllers, the test can indicate the test failed due to multiple engine function identifications and can provide a controller information table which identifies the suspect controller. A test failure is indicated to the user 516 and information regarding the failure can be output to the user 518. The user can also be provided with a controller information table 520 which provides information on the suspect controller 522. If no identification failures are found, the test can continue other checks in the ready to program test 524.

Figure 9:
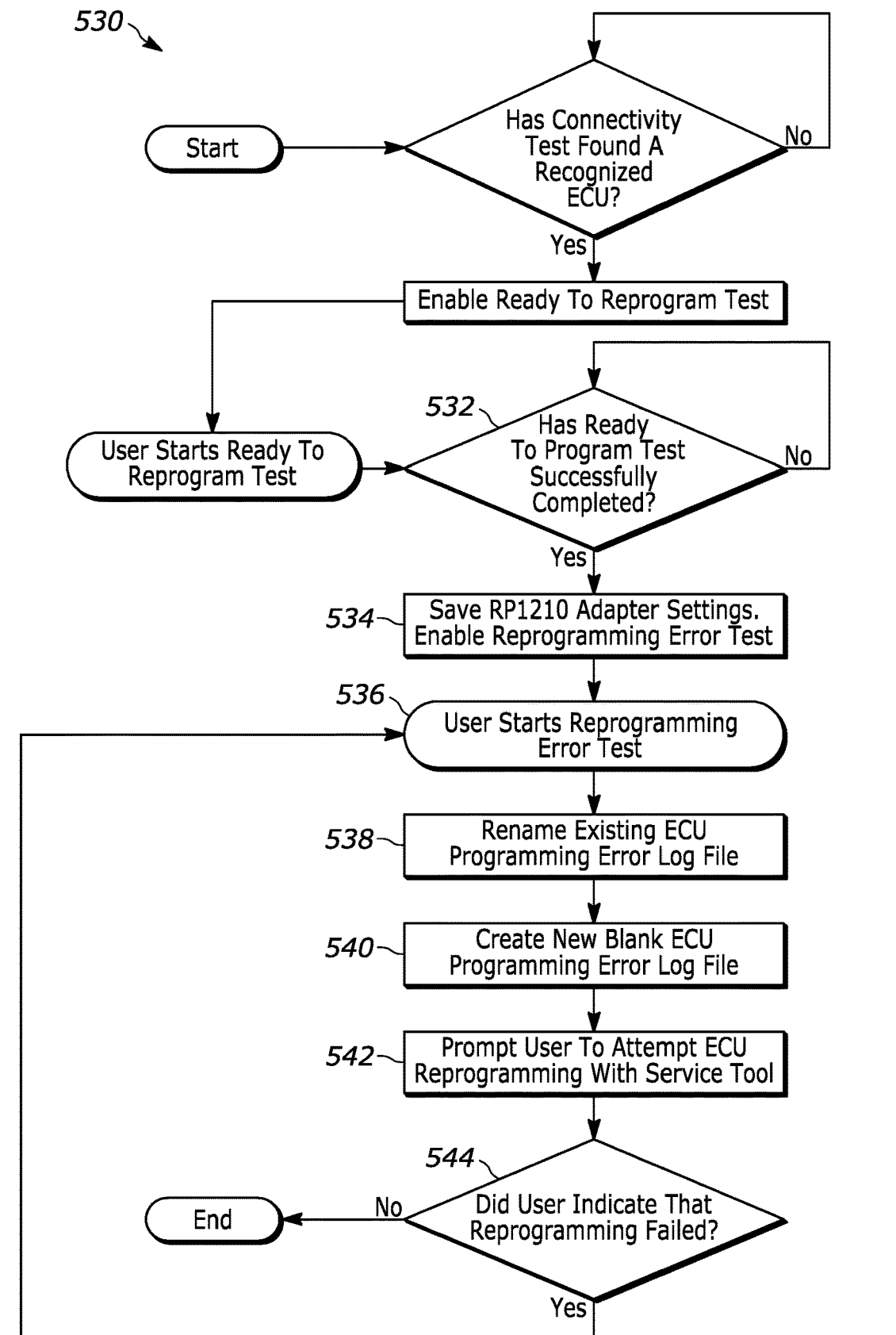
FIG. 9 is a flow chart illustrating a controller reprogram error test.
Figure 10:
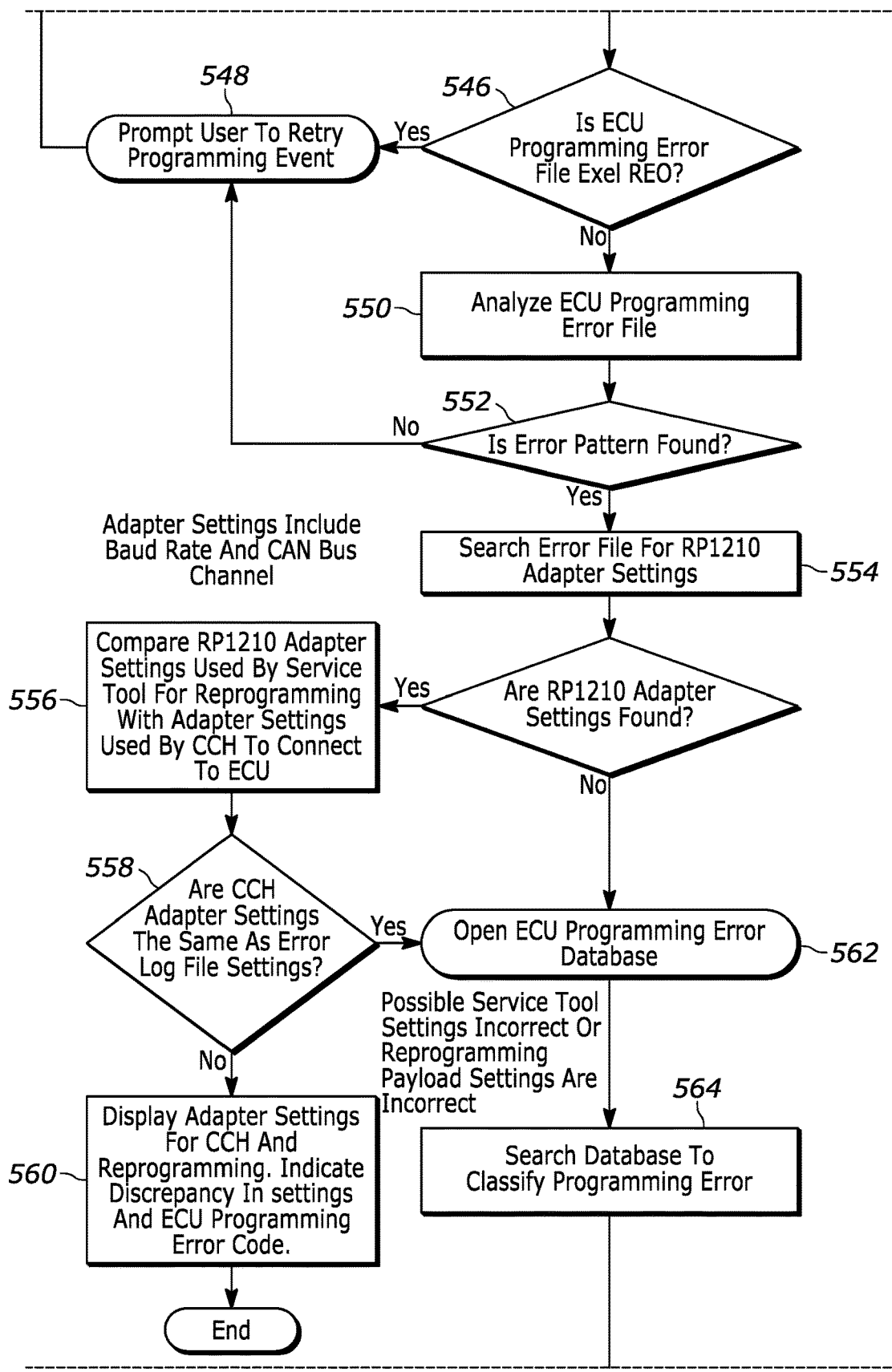
FIG. 10 is a continuation of the controller reprogram error test of FIG. 9.
Figure 11:
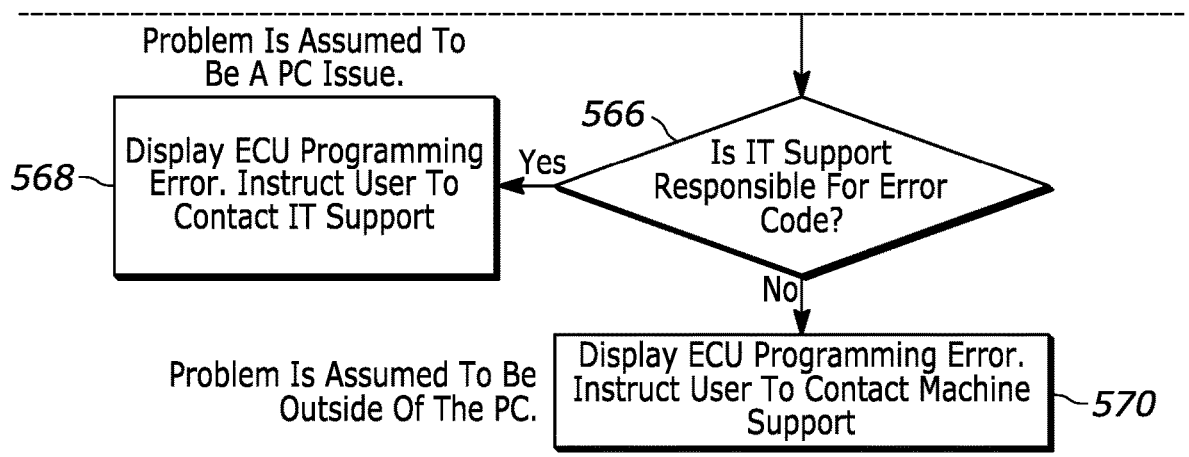
FIG. 11 is a continuation of the controller reprogram error test of FIGS. 9 and 10.

FIGS. 9-11 show an exemplary Reprogramming Error Test 530. In the Reprogramming Error Test 530, the system can initiate the Ready to Reprogram Test 500 described above to determine any initial reprogramming readiness errors. Once the Ready to Reprogram Test 500 is successfully completed 532 the system will save the adapter settings and enable the Reprogramming Error Test 534. The user starts the Reprogramming Error Test 536 and the system will rename the existing ECU programming error log 538 and create a new blank ECU reprogramming error log 540. The user will then attempt a controller reprogramming, for example through a technician service diagnostic tool 542. If the reprogramming fails 544 a determination is made to see if a set amount of time has passed since the reprogramming error file was created 546, for example 5 minutes or longer. If the reprogramming event is too old, the user will be prompted to retry the reprogramming event 548. If the reprogramming event is current, the system opens the programming error file and analyzes the error codes 550. The system can be looking for specific error codes and specific patterns of error codes that correlate to a database of known reprogramming problems. If no pattern is found, the user can be prompted to retry the programming event 548. If an error pattern is found 552, a search of the error file is performed to locate the adapter settings 554. If the adapter settings are found they can be compared with the adapter settings used by the CCH 30 to connect to the controller 556. The comparison can determine if the CCH adapter settings are the same as the error log files 558. If the adapter setting are not the same as the error log files, this discrepancy is output to the user 560. The user can also be directed to a potential solution based on this error, for example in a technical manual or other solution notice. If the adapter settings are the same, or if the adapter settings were not found, then the system will open the controller programming error database 562. A search and analysis is performed using the database to determine how to classify the programming error 564. If the error is likely in the PC, the controller reprogramming error is classified as an IT support issue 566. The error is displayed to the user and the user can be instructed to contact IT support 568. An example of this type of error is a user permission error, where the machine is not licensed to run the controller program, or the license has expired. IT support can be contacted to provide an updated license. If the error is outside of the PC, the programming error is displayed to the user and the user can be instructed to contact machine support 570. An example of this type of error is a controller software bundle error.

Apart from the Ready to Program 500 and Reprogramming Error 530 tests, the CCH 30 can separately perform a name check of the controllers to see if there are any conflicting controller identification issues as shown in steps 510-522 of FIGS. 7 and 8. The CCH 30 can query the connected controllers to obtain their identifications and leverage the knowledge of the topography to determine if there are any faults associated with the identification. The location of the misidentifying controller can be shown to a technician so that it can be reprogrammed or replaced as needed.

In certain embodiment, CCH 30 can perform a Missing Controller Test 600 to determine if there is a missing source address in the controller table. The source addresses for each controller connected to the bus can be populated by the system. The Missing Controller Test 600 can determine if a controller has failed to work or gone silent by analyzing error codes from other controllers. The Missing Controller test 600 can also analyze the error code to determine if the controller has lost communication with other controllers on the network. For example, controllers expecting a communication from another controller that has gone silent can issue a specific error code indicated that it failed to receive a message. In other embodiments, the error code can be sent from a sensor or other engine component. The error code can be analyzed by the Missing Controller Test 600 to determine if it contains this error code, and an indication of the missing controller can be provided to a user. For example, the user can be provided with a graphical network topology of the controllers (as shown in FIG. 6) with an indication of a missing controller and the missing source address. The missing source address information can be used along with a schematic of the topology of the controllers to determine where a problem may be physically located on a machine.

Figure 12:
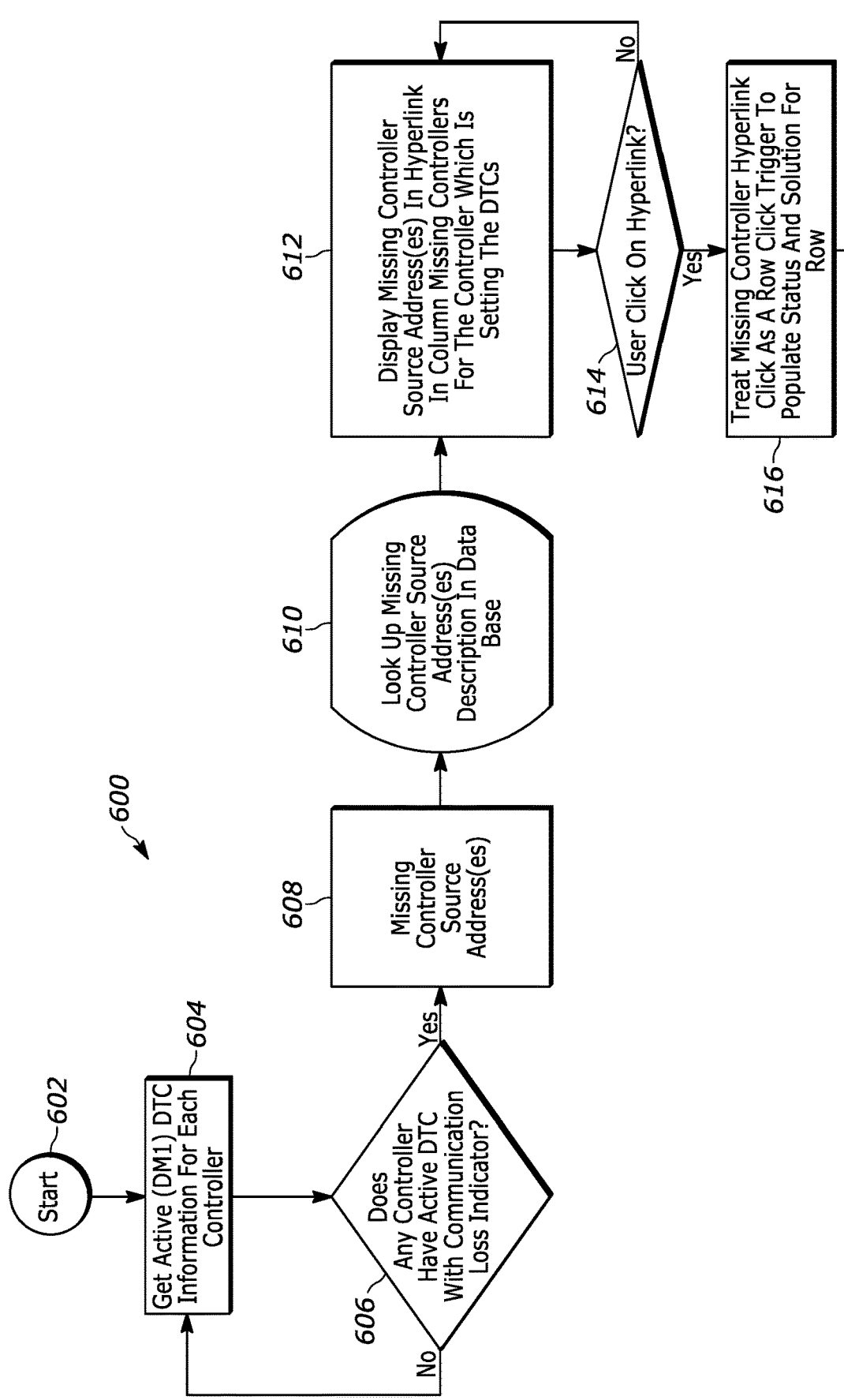
FIG. 12 is a flow chart illustrating a missing controller test.

FIGS. 12 and 13 show an exemplary embodiment of the Missing Controller Test boo. The test is initiated 602 by a user or the system and begins by obtaining any active error codes for each controller 604. The error codes are analyzed to determine if there are any active error codes that indicate a communication loss 606. If a communication loss is found, the error code can be further analyzed to determine the missing controller source address 608. A description of the missing controller is then determined from a database of the controllers on the machine 610. This database can be local to the machine or remote, such as through a dealer system or telematics system. The missing controller address can be displayed to the user and a hyperlink can be provided 612. If the hyperlink is selected 614, the selection triggers a population of the controller status and a potential solution that is provided to the user 616. The information from the database can be displayed to the user 618 in a pop-up window 620. The window 620 can display the type of controllers found, the missing controller, status details, and the potential solution.

In certain embodiments, the CCH 30 can provide a confidence indicator along with a diagnostic. The confidence indicator can be incorporated with a graphical representation of the controller topography as shown in FIG. 6 or as part of a separate list of potential issues which are ranked. Service technicians can be skeptical of proposed solutions to a problem provided by technical support personnel or an automated system and may be reluctant to follow the instructions unless proof is provided to support the analysis of the problem. Technicians who do not fully understand the operation of a system may have difficulty in determining what proof indicates that a component is or is not a likely cause of the problem. Since there may not be a solid understanding by the technician of how a component functions as a part of the system, guessing or random replacement of components often becomes the primary means of diagnosing the problem. Components are replaced until the problem is resolved, often at great expense to the manufacturer or end customer. To avoid this issue, the confidence indicator can be used with a component to provide a confidence level of the diagnostic. The confidence indicator can be numerical, color coded, or graphical. For example a specific value (e.g., 0-100%) can be provided. In another example different colors (e.g., green=no problem, yellow=potential problem, red=definite problem, grey=loss of communication) can be used to indicate a problem. In another example, different icons can be presented that indicate a specific or potential problem.

In certain embodiments, the CCH 30 can be configured to use multiple communication methods to pinpoint connection issues. For example, instead of detecting connection issues over only CAN bus circuits, the CCH 30 system can utilize Ethernet connections, wireless connections, remote network connections, or other communication types to determine a connection issue. The CCH 30 can use these communication methods to better pinpoint faults and abbreviate or remove diagnostic steps by using wired and wireless connections to query device health and connection status.

General methods to isolate a communication failure can only localize a failure within a component or CAN bus communication network. Due to high cost to diagnose faults, localized diagnostics of CAN bus communication networks often require over 1 hour to diagnose faults, leading to decreased customer satisfaction and unplanned downtime as machines are often inoperable. Moreover, it is typical to have dozens of controllers on the network which are often embedded and not easily accessible, compounding the time to gain access to begin diagnostic procedures. While localized diagnostics are useful, a user will have to methodically test CAN bus circuits at controllers one by one until a fault is found. With only one communication method, a troubleshooter must verify power circuitry and the network circuitry if a device is not communicating, leading to increased time to diagnose the issues.

Using multiple communications methods over both CAN bus, Ethernet, wireless and remote networks for increased data transmission and various machine functions, diagnostics leveraging these various communication methods can better pinpoint faults and abbreviate, or remove, diagnostic steps. The combination of using the multiple communication methods allows a user to review health of CAN, via Ethernet and vice versa. This advantage allows a user to diagnose network issues via these other routes. For example, one can pinpoint a power circuit issue if multiple communication networks fail to connect to device. Likewise, with a healthy power circuit to one, or multiple devices, the device(s) can provide health status via the various communication methods to help a troubleshooter pinpoint a network issue to CAN, Ethernet, or even wireless communication.

Figure 14:
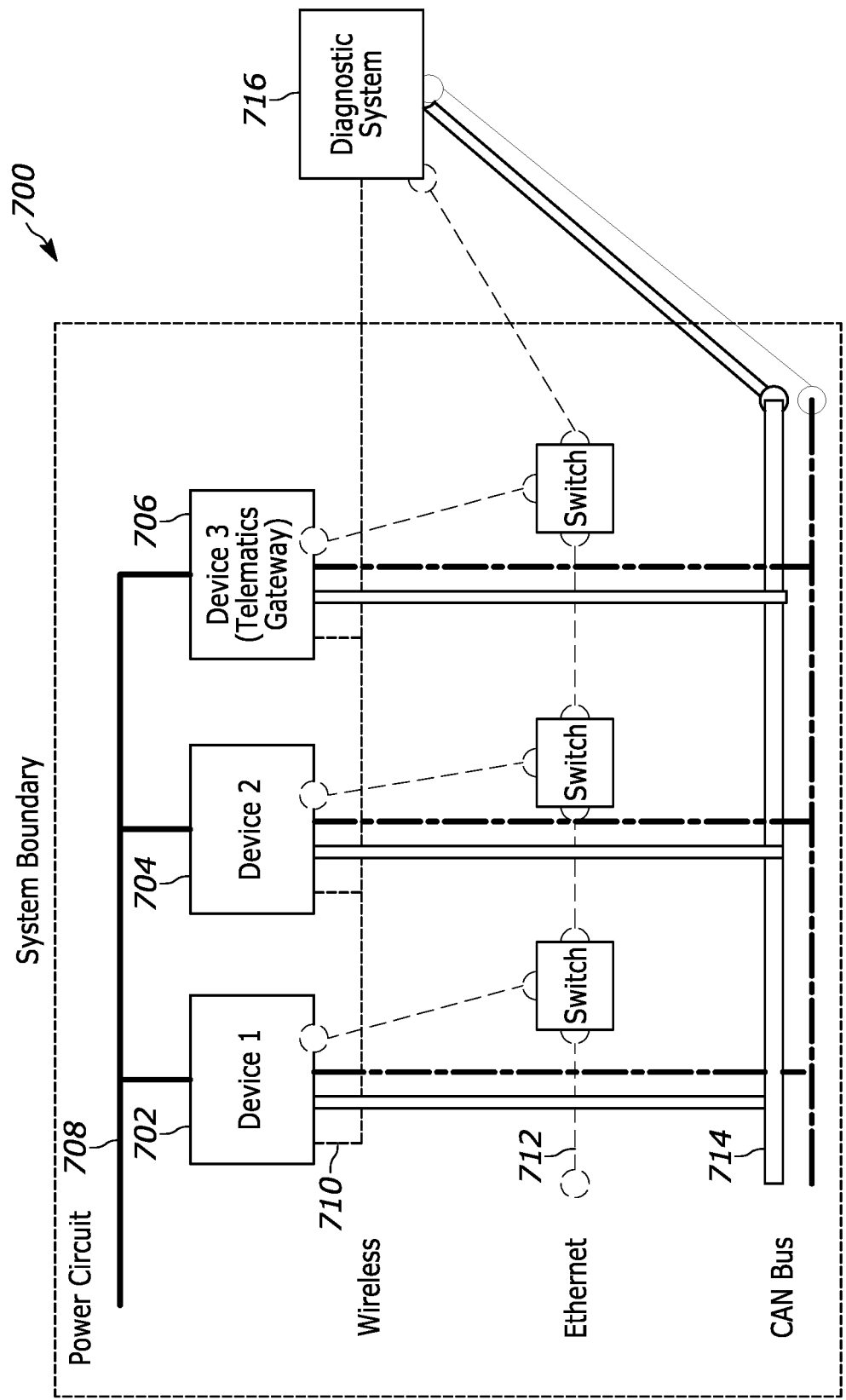
FIG. 14 is a schematic of a system using multiple communication methods to diagnose a connection issue.

FIG. 14 shows an example of a machine system 700 having a first device 702, a second device 704, and a third device 706. The devices can be controllers, sensors, communication units, or other devices connected to the machine system 700. Each of the devices is connected to a power circuit 708. The devices are in communication with a CAN bus connection 710, an Ethernet connection 712, and a wireless connection 714. A diagnostic system 716 can be connected to each communication system to query information about the devices. The diagnostic system 716 is able to obtain additional information that is not available from a CAN connection alone, and allows the system to obtain information if there is an issue with CAN bus communication. The diagnostic system 716 connection can be a wired connection or a wireless connection, such as through WiFi or Bluetooth. The diagnostic connection can be local or remote. With a remote connection, a failure can be pinpointed without the need to be at the machine or without having to dig into system diagnostics, alleviating technician error and incorrect diagnostic procedures and incorrect, or unnecessary repairs. Connecting to devices via multiple communication types can leverage the knowledge of the system topography to provide a clear list of items that may not be causing the problem so that possible solutions can be more narrowly tailored.

Figure 15:
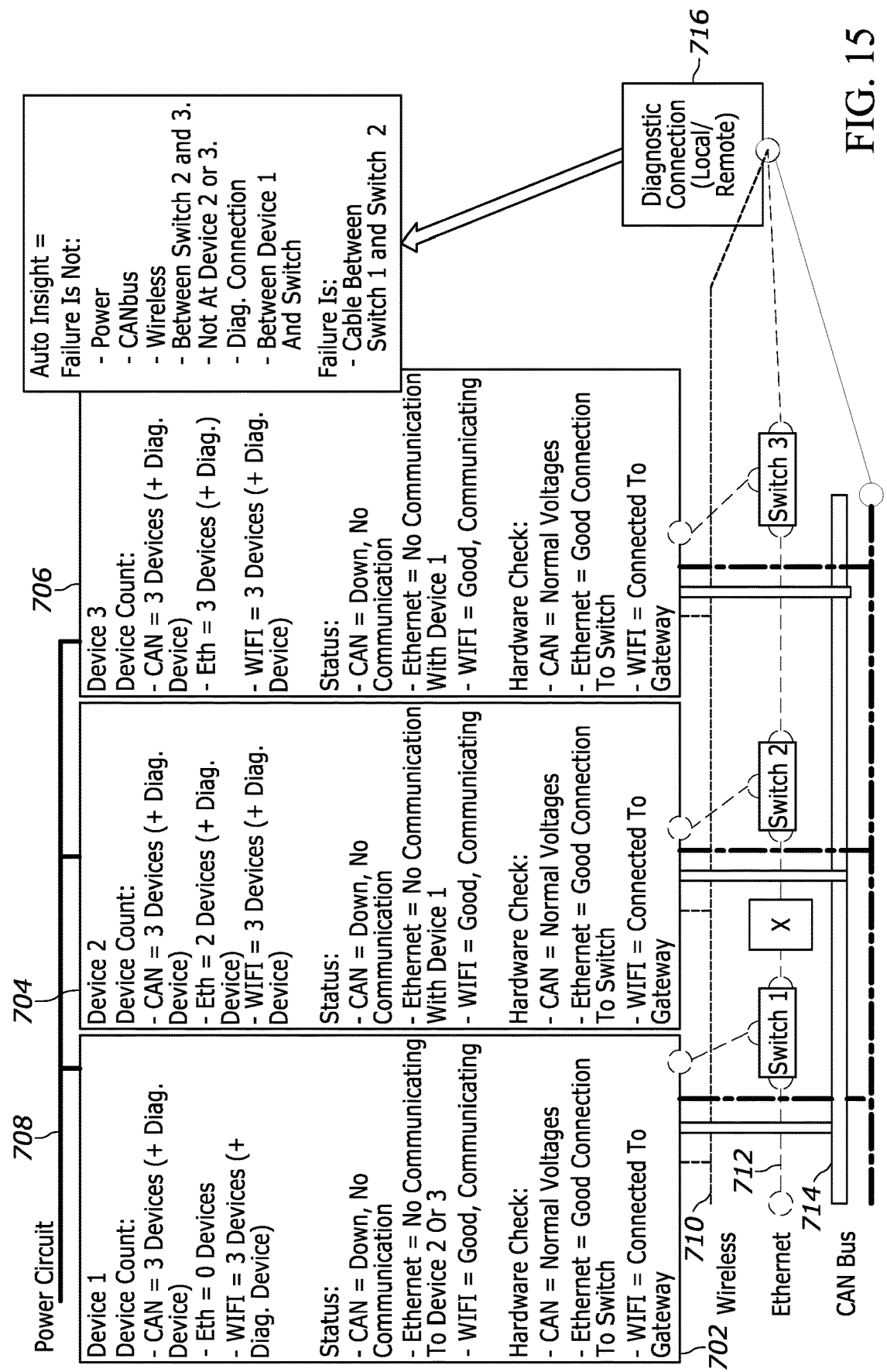
FIG. 15 is a schematic showing the system of FIG. 14 diagnosing a connection issue.

FIG. 15 shows an exemplary diagnostic procedure utilizing wireless 710, ethernet 712, and CAN 714 communication. When an error code is causing problems, the diagnostic system 716 can obtain connection status information from the system, as shown in the device boxes. A device count is performed to determine the number of devices connected through each channel for each device. A status check is performed to determine the communication status of each device. A hardware check is performed to determine the hardware status of the connections. The CCH 30 can analyze the obtained data and determine what is not causing the problem and what is, or potentially is, causing the problem. In the illustrated example, the issue is determined to be an ethernet cable connection between device 1 and device 2. As shown, it is determined that device 1 does not have an ethernet connection to device 2 or 3, and devices 2 and 3 are not communicating with device 1 over the ethernet connection.

Figure 16:
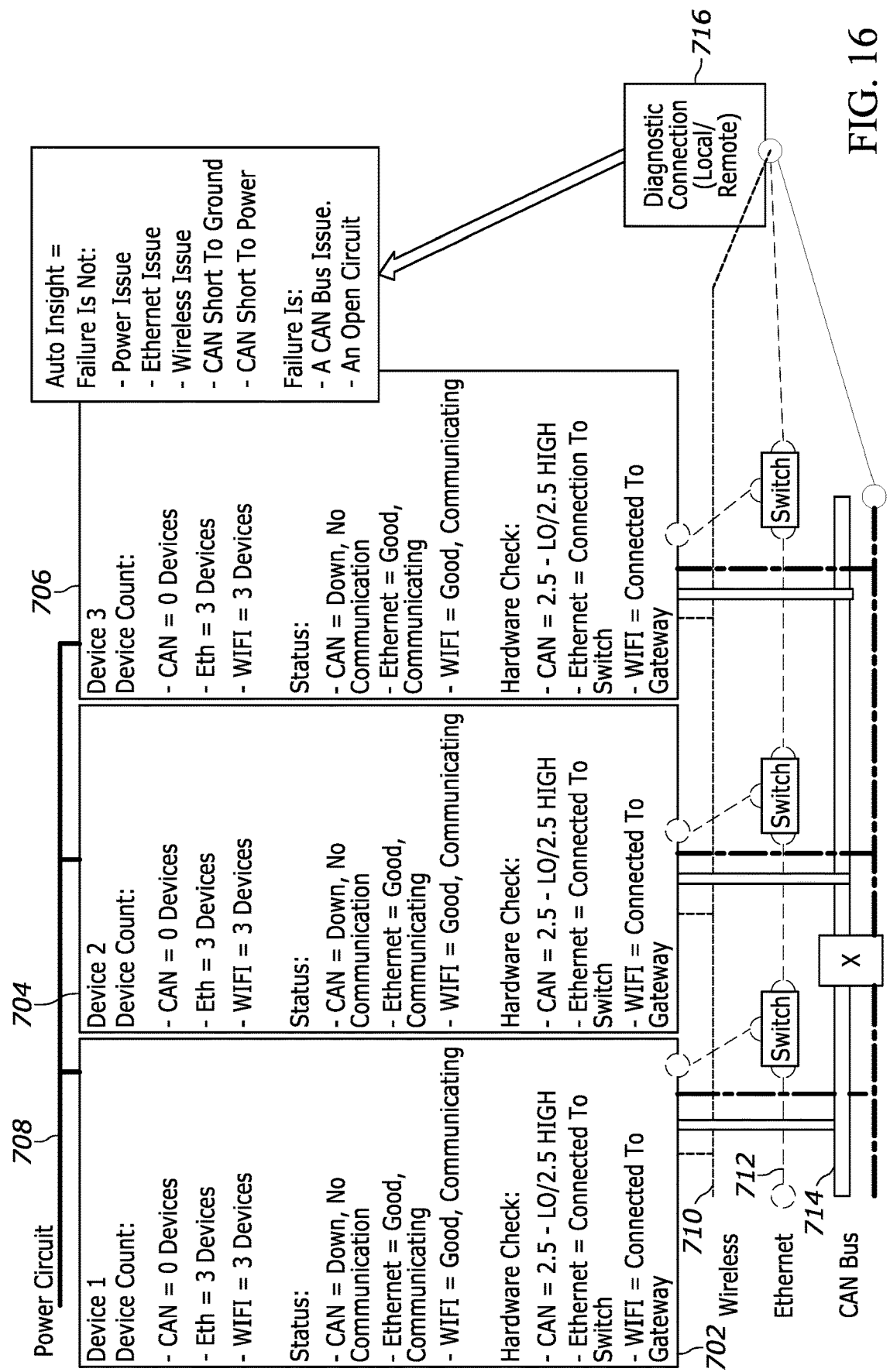
FIG. 16 is a schematic showing the system of FIG. 14 diagnosing a connection issue.

FIG. 16 illustrates an example where the diagnostic system 716 determines that there is an issue with the CAN bus connection 714. As shown, the devices are showing communication over the ethernet and WIFI, but there is no CAN communication. If multiple methods of communication were not being used, it would be more difficult to diagnose this problem, as communication with the devices over the CAN bus alone would not be possible. The system is also able to determine that the issue is not with the power or a CAN short to power or ground, reducing the number of potential issues for the user to diagnose.

Figure 17:
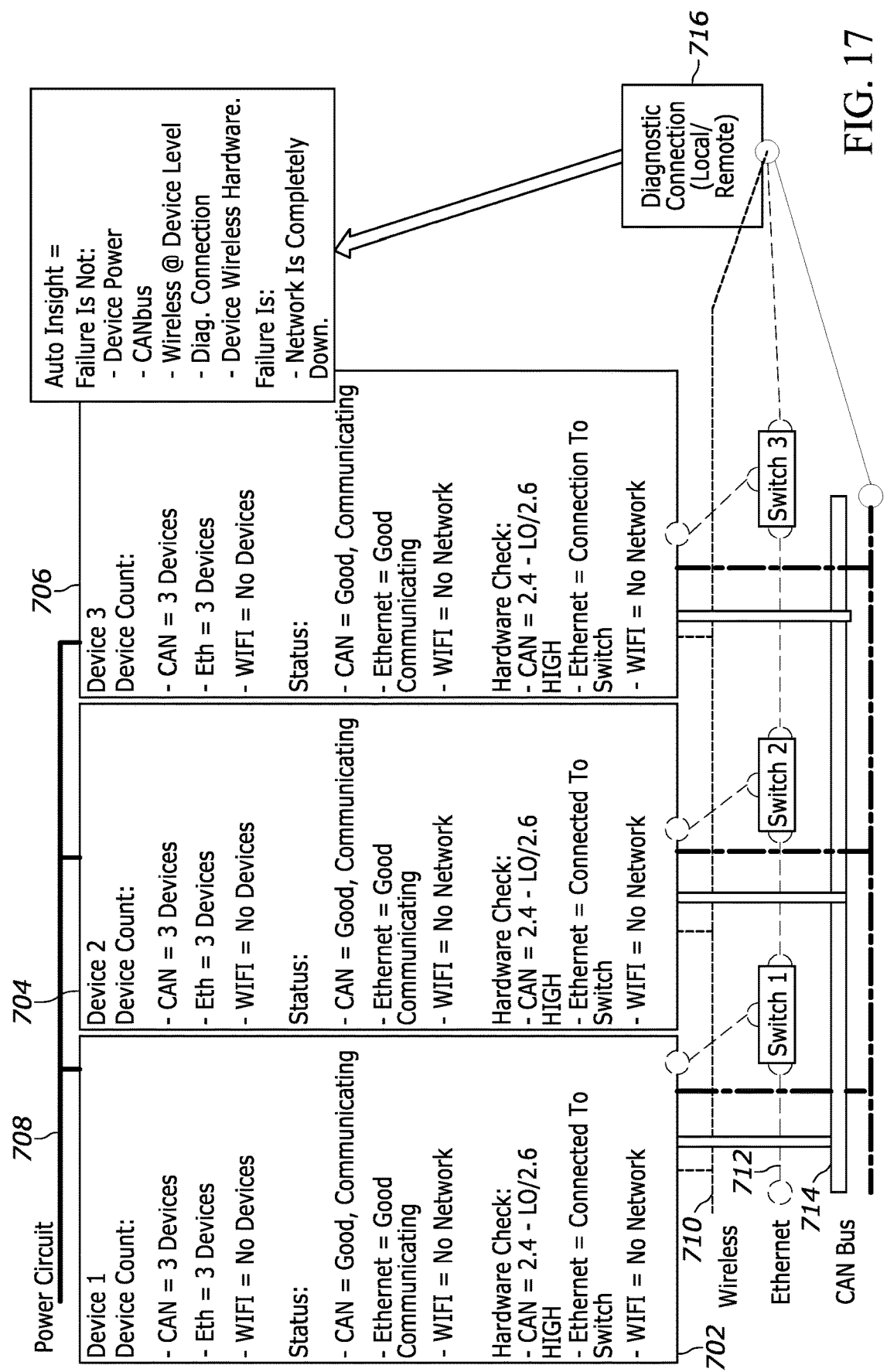
FIG. 17 is a schematic showing the system of FIG. 14 diagnosing a connection issue.

FIG. 17 illustrates an example where the diagnostic system 716 determines that there is an issue with the wireless connection 710. As shown, the devices are showing communication over the ethernet and CAN, but there is no WIFI communication due to no network being found by the devices.

After the analysis the potential failures and known non-failures can be output to a user along with a potential solution to allow them to diagnose and fix the problem. In certain instances, a fault matrix can be created to determine a potential problem. This can be especially useful for complex systems that a high number of components. The output to a user can be a text-based solution and/or a graphical representation of the system that shows the type and location of the failure.

Figure 18:
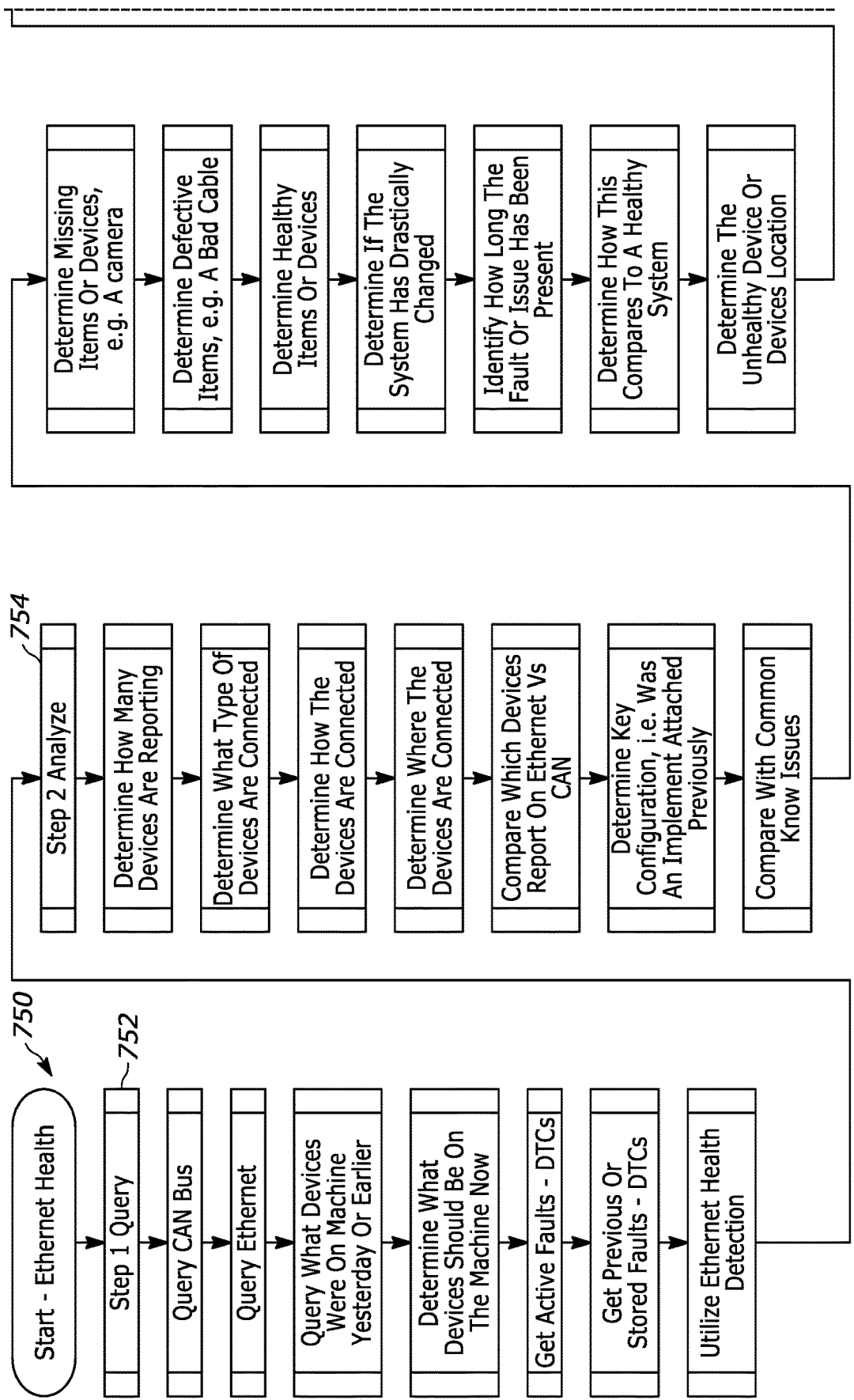
FIG. 18 is a flow chart illustrating a diagnosis of a connection issue over multiple communication paths.
Figure 19:
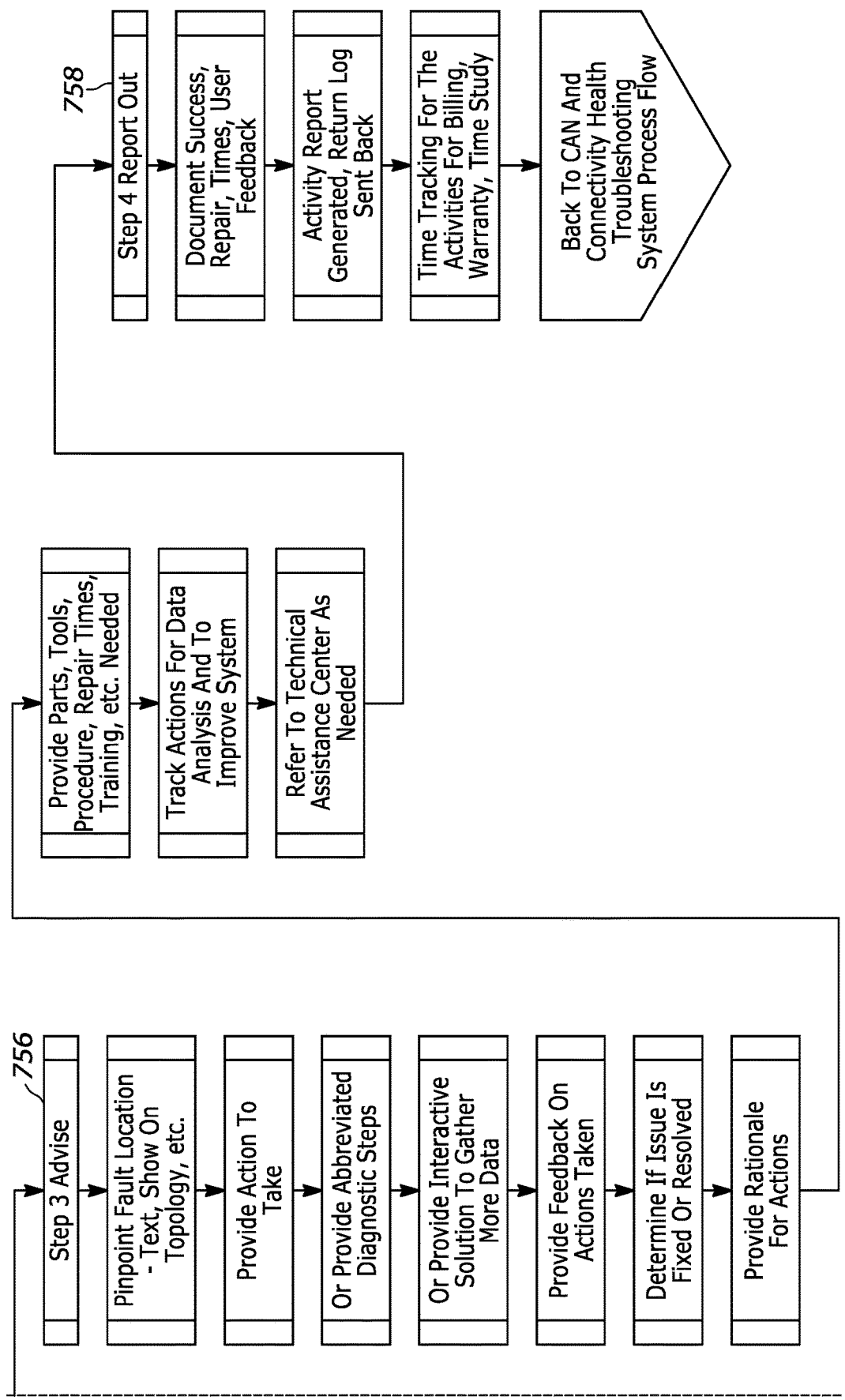
FIG. 19 is a continuation of the diagnosis of a connection issue over multiple communication paths shown in FIG. 18.

FIGS. 18 and 19 show an exemplary connection test performed over multiple communication channels including an ethernet diagnostic 750. In step 1 (752), a query of the connected devices is performed to determine connection status and to retrieve any error codes. The query 752 can include a CAN bus query, an Ethernet query, a query to determine prior devices on the machine, a determination of device that should be on the machine now, an error code retrieval, and an ethernet health detection. In step 2 (754), an analysis of the acquired information is performed. The analysis can include determining how many devices are reporting, determining what type of devices are connected, determining how the devices are connected, determining where the devices are connected, comparing devices reporting on ethernet to devices reporting on CAN, determining the key configuration, comparing this information to identify known issues, determining missing devices, determining defective items, determining healthy devices or items, determining drastic system changes, determining duration of present fault, determining how the current system compares to an ideal healthy system, determining the location of unhealthy items or devices. IN step 3 (756), based on the analysis, a user is informed of any issues and potential solutions to those problems. This can include pinpointing fault location, for example through a text description or graphical representation, providing an action to take, providing diagnostic steps, providing interactive solution to gather more data, providing feedback on actions taken by the user, further determining if the issue is resolved, providing rationale for actions to take, providing a confidence indicator for actions to take, providing a description of parts, tools, procedures, repair times, or additional training, tracking actions for data analysis, and referring to technical assistance. In step 4 (758), a report is made and a log is sent. The report can document the success, repair requirements, repair time, and user feedback. This information can be logged and used to activity report and log to a user, dealer, manufacturer, or other relevant parties.

In certain embodiments, the CCH 30 can be configured to perform a sequencing operation to trouble shoot multiple error codes from stored DTCs from all controllers on the machine. In one example, if a single controller is reporting multiple errors, the source addresses can be extracted from the suspect parameter number and failure mode identifier to indicate a list of controllers which are missing (active or stored). A user can then be prompted to look at topology to determine if all missing controllers are on the same section of the CAN network which can indicated a shared CAN connector harness for all the controllers is missing). The source address can also be used to determine the function of the controller from the known system topography. A user can then be prompted to determine another factor of the machine operation to help determine the issue. For example, if controllers are indicating a loss of communication with the ECU, a user can be asked to determine if the engine runs, or if another verifiable component of the system is operating. If it is operating correctly, this information can help identify the issues as a CAN communication issue and not a faulty controller, power, ground, or hardware issue.

Figure 20:
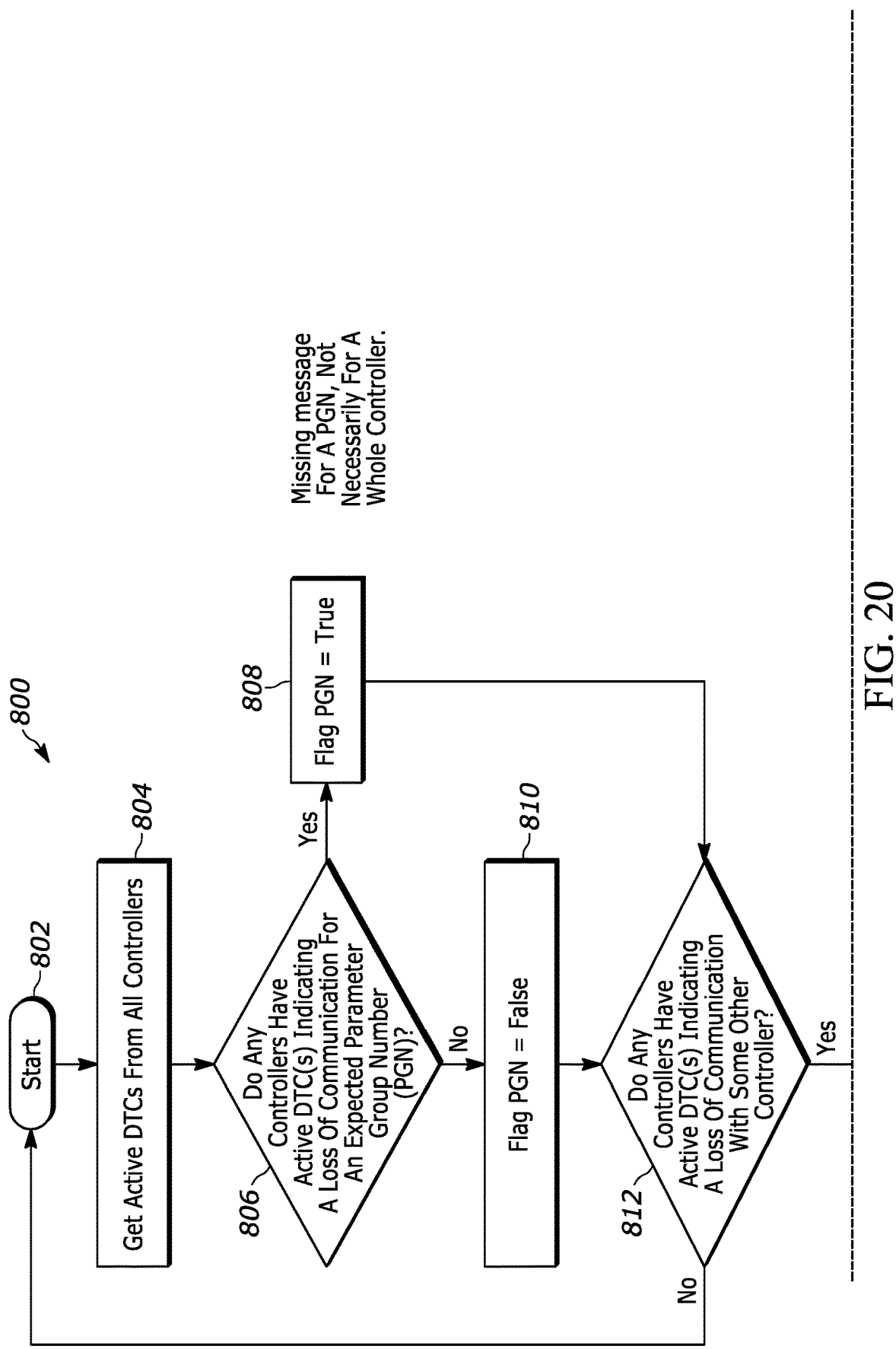
FIG. 20 is a flow chart illustrating an error code sequencer diagnostic procedure.
Figure 21:
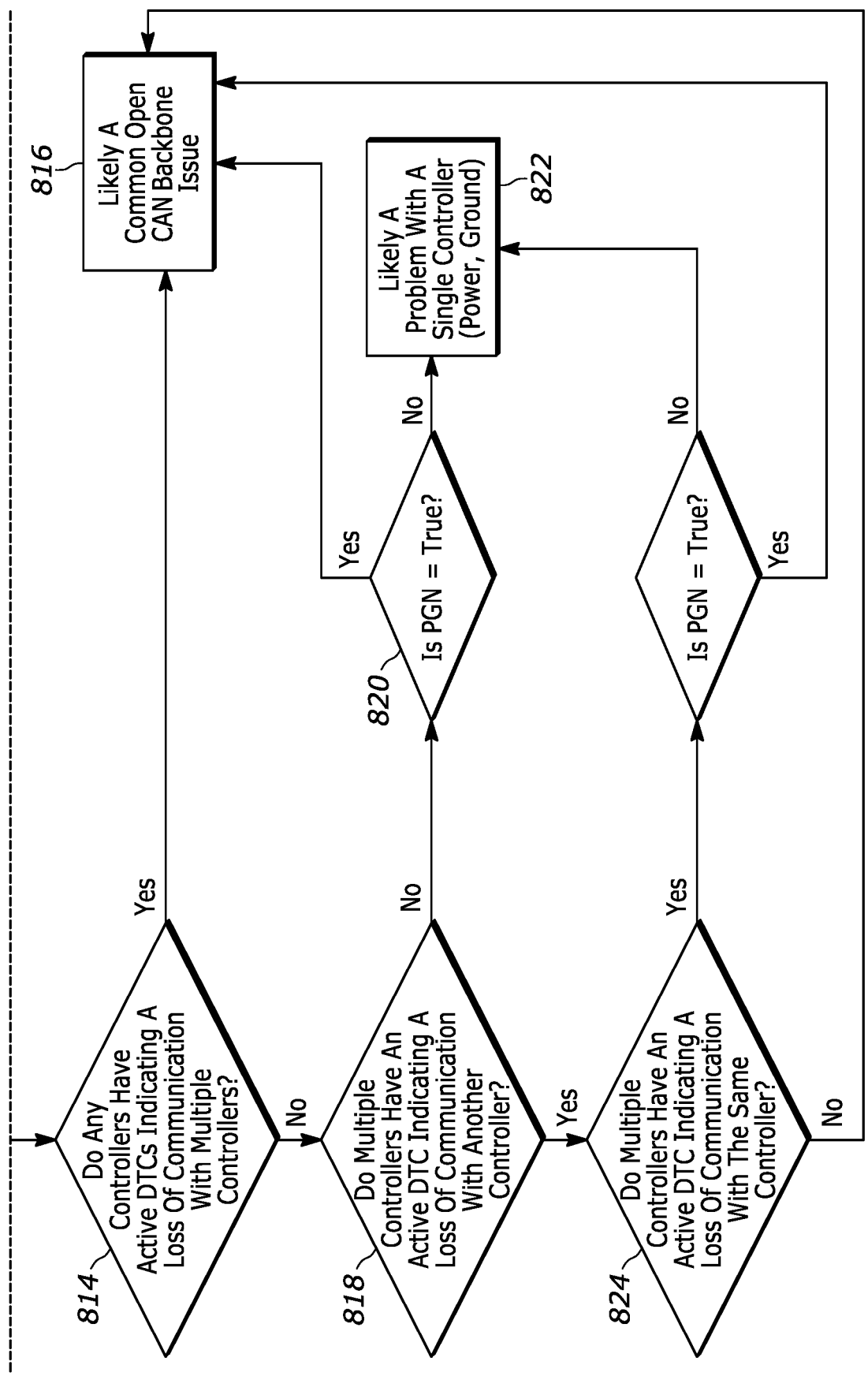
FIG. 21 is a continuation of the error code sequencer diagnostic procedure shown in FIG. 20.

FIGS. 20 and 21 show an exemplary error code sequencing operation 800. The test is initiated 802 by a user or the system and begins by obtaining any active error codes for each controller 804. Next the system determines if the any of the controllers have error codes that indicate a loss of communication for an expected parameter group number (PGN) 806. If so, the issue can be flagged as True 808 for a missing message for a PGN, not for a specific controller. If not, the issue is flagged as False 810 for missing message for a PGN. Next it is determined if any controllers have error codes that indicate a loss of communication with another controller 812. Next it is determined if any controllers have error codes indicating a loss of communication with multiple contorlelrs 814. If so, the communication issues can be diagnosed as a common open CAN backbone issue 816. If not, it is determined if multiple controllers have error codes that indicate a loss of communication with another controller 818. If not, it can be analyzed if the PGN was flagged as true 820 in step 808. If true, the issues can be diagnosed as a common open CAN backbone issue 816. If false, then the issue can be diagnosed as a likely problem with a single controller 822, such as a power or ground problem. If multiple controllers are found to have an active error code with a communication loss with another controller in step 818 then it can be determined if the errors all include the same source address indicating a communication loss with the same contorller 824. If yes, then it can be determined if the PGN was flagged as true 826. If true, the issues can be diagnosed as a common open CAN backbone issue 816. If false, then the issue can be diagnosed as a likely problem with a single controller 82. If the source addresses are not the same in step 824 then the issues can be diagnosed as a common open CAN backbone issue 816.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the term "user" is inclusive of owners, operators, technicians, dealers, service providers, and other individuals associated with the operation, sales, and maintenance of a machine, the term is therefore intended to facilitate the description of the exemplary embodiments of the present disclosure, and is not intended to limit the structure or operation of the exemplary embodiments of the present disclosure to any particular person. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A method of diagnosing a connection or communication issue with an industrial machine comprising:
    connecting a diagnostic system to an electronic processing system of an industrial machine, wherein the electronic processing system includes a CAN bus, an ethernet network, and a plurality of devices connected to the CAN bus and the ethernet network, wherein the plurality of devices includes at least one controller programmed to run one or more software applications;
    performing a connectivity check to obtain CAN connection status data and ethernet connection status data for the plurality of devices;
    analyzing the CAN connection status data and the ethernet connection status data to determine one or more components of the industrial machine that are a likely cause of a device connection issue;
    determining a physical location of the determined one or more components within the industrial machine; and
    outputting a solution to the device connection issue to a user based on the analyzed data, wherein the solution provides the determined physical location of the determined one or more components.

2. The method claim 1, wherein connecting to the electronic processing system includes connecting from a remote location over a network or connecting locally onsite.

3. The method of claim 1, further comprising capturing and storing resolution information.

4. The method of claim 1, wherein analyzing the CAN connection status data and the ethernet connection status data includes determining if a controller is connected to a power circuit.

5. The method of claim 1, further comprising performing a hardware check on the connected devices.

6. The method of claim 1, wherein the plurality of devices are connected to a WiFi network and the connectivity check includes obtaining WiFi connection status data.

7. The method of claim 1, wherein outputting a solution to the device connection issue includes providing a confidence indicator of the diagnostic solution, wherein the confidence indicator includes indication of devices that are not the problem and indication of at least one potential problem, and wherein the confidence indicator includes color indicator.

8. The method of claim 1, wherein outputting a solution to the device connection issue includes providing a confidence indicator of the diagnostic solution, wherein the confidence indicator includes indication of devices that are not the problem and indication of at least one potential problem.

9. The method of claim 8, wherein the confidence indicator includes a color coded indicator.

10. An industrial machine connection and communication diagnostic system comprising:
a diagnostic system having a communication interface configured to connect to an electronic processing system of an industrial machine, wherein the electronic processing system includes a CAN bus, an ethernet network, and a plurality of devices connected to the CAN bus and the ethernet network, the plurality of devices including at least one controller programmed to run one or more software applications,
wherein the diagnostic system includes one or more processors and is configured to,
initiate a CAN bus check to obtain CAN bus data,
initiate an ethernet connection check to obtain ethernet connection data,
receive telematics data that includes past industrial machine health data,
analyze the CAN bus data, the telematics data, and ethernet connection data to determine a likely cause of an industrial machine connection or communication issue, and
output a solution to the industrial machine connection or communication issue to a user based on the analyzed data.

11. The connection and communication diagnostic system of claim 10, wherein the communication interface includes at least one of a wired connection and a wireless connection.

12. The connection and communication diagnostic system of claim 10, wherein the ethernet network includes a plurality of switches and a plurality of cables, and wherein analyzing the ethernet connection data includes determining if there is a connection issue between any of the plurality of switches.

13. The connection and communication diagnostic system of claim 10, wherein the plurality of devices are connected to a WiFi network and the connectivity check includes obtaining WiFi connection status data.

14. The connection and communication diagnostic system of claim 10, wherein the plurality of devices are connected to a power circuit and wherein analyzing the CAN bus data and ethernet connection data includes determining if there is a power issue.

15. The connection and communication diagnostic system of claim 10, wherein outputting a solution includes at least one of providing steps to resolve an issue, providing a solution article, and providing a link.

* * * * *